United States Patent
Shibata

(10) Patent No.: US 8,798,373 B2
(45) Date of Patent: Aug. 5, 2014

(54) IMAGE RESTORATION SYSTEM, IMAGE RESTORATION METHOD, AND IMAGE RESTORATION PROGRAM

(75) Inventor: Takashi Shibata, Minato-ku (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 13/510,887

(22) PCT Filed: Nov. 19, 2010

(86) PCT No.: PCT/JP2010/006804
§ 371 (c)(1),
(2), (4) Date: May 18, 2012

(87) PCT Pub. No.: WO2011/061943
PCT Pub. Date: May 26, 2011

(65) Prior Publication Data
US 2012/0230591 A1    Sep. 13, 2012

(30) Foreign Application Priority Data
Nov. 20, 2009  (JP) ................................. 2009-265038

(51) Int. Cl.
*G06K 9/46* (2006.01)
*G06K 9/20* (2006.01)

(52) U.S. Cl.
USPC ......................................... 382/195; 382/282

(58) Field of Classification Search
None
See application file for complete search history.

(56) References Cited

U.S. PATENT DOCUMENTS

| | | | | |
|---|---|---|---|---|
| 8,233,739 | B1 * | 7/2012 | Cho et al. | 382/276 |
| 8,285,055 | B1 * | 10/2012 | Barnes et al. | 382/195 |
| 8,340,463 | B1 * | 12/2012 | Cho et al. | 382/276 |

(Continued)

FOREIGN PATENT DOCUMENTS

| | | |
|---|---|---|
| JP | 2005-149506 A | 6/2005 |
| JP | 2007-087253 A | 4/2007 |

(Continued)

OTHER PUBLICATIONS

Cuzol, A., Pedersen, K.S., and Nielsen, M., Field of Particle Filters for Image Inpainting, 2008, J Math Imaging Vis, vol. 31, pp. 147-156.*

(Continued)

*Primary Examiner* — Stephen R Koziol
*Assistant Examiner* — Jonathan S Lee
(74) *Attorney, Agent, or Firm* — Sughrue Mion, PLLC

(57) ABSTRACT

A defect pixel value estimation means estimates a pixel value which each pixel in a defect region as a region to be restored in an image may take, based on the pixel value of pixels in a non-defect region as a region in the image not including the defect region. A patch selection means selects a pair of patches in which a defect patch and a reference patch are most similar to each other from pairs of patches including the defect patch as the image of a region including the defect region and the reference patch as the image of a region not including the defect region. The patch selection means selects a pair of patches in which the image of the defect patch and the image of the reference patch are most similar to each other based on a relationship between the pixel value of the defect region estimated in the defect patch and the pixel value of the corresponding reference patch. An image restoration means restores the defect patch based on the reference patch in the selected pair of patches.

24 Claims, 22 Drawing Sheets

(56) References Cited

U.S. PATENT DOCUMENTS

| | | | |
|---|---|---|---|
| 8,483,480 B2 * | 7/2013 | Smith et al. | 382/173 |
| 2005/0105780 A1 | 5/2005 | Ioffe | |
| 2005/0168482 A1 * | 8/2005 | Criminisi et al. | 345/619 |
| 2006/0045372 A1 * | 3/2006 | Wang et al. | 382/254 |
| 2007/0071317 A1 | 3/2007 | Kubo et al. | |
| 2008/0238942 A1 * | 10/2008 | Sun et al. | 345/634 |
| 2009/0201556 A1 | 8/2009 | Hara | |
| 2009/0252424 A1 | 10/2009 | Mine et al. | |
| 2010/0177978 A1 * | 7/2010 | Jeong et al. | 382/254 |
| 2011/0103706 A1 * | 5/2011 | Jeong et al. | 382/254 |
| 2013/0083965 A1 * | 4/2013 | Joung et al. | 382/103 |

FOREIGN PATENT DOCUMENTS

| | | |
|---|---|---|
| JP | 2008-300990 A | 12/2008 |
| JP | 2009-188965 A | 8/2009 |
| JP | 2009-251793 A | 10/2009 |

OTHER PUBLICATIONS

Koppel, M., Doshkov, D., and Ndjiki-Nya, P., Fully Automatic Inpainting method for Complex Image Content, 2009, WIAMIS, pp. 189-192.*

Levin, A., Zomet, A., and Weiss, Y., Learning How to Inpaint from Global Image Statistics, 2003, Ninth IEEE International Conference on Computer Vision, vol. 1, pp. 305-312.*

Criminisi, A., et al., "Region Filling and Object Removal by Exemplar-Based Image Inpainting," IEEE Transactions on Image Processing, Sep. 2004, pp. 1200-1212, vol. 13, No. 9.

Li, Bianru, et al., "An image inpainting method," Ninth IEEE Conference Computer Aided Design and Computer Graphics, 2005, pp. 531-536.

* cited by examiner

IMAGE RESTORATION SYSTEM, IMAGE RESTORATION METHOD, AND IMAGE RESTORATION PROGRAM

CROSS REFERENCE TO RELATED APPLICATION

This application is a National Stage of International Application No. PCT/JP2010/006804, filed on Nov. 19, 2010, which claims priority from Japanese Patent Application No. 2009-265038, filed on Nov. 20, 2009, the contents of all of which are incorporated herein by reference in their entirety.

TECHNICAL FIELD

The present invention relates to an image restoration system, an image restoration method and an image restoration program, and particularly to an image restoration system, an image restoration method and an image restoration program for restoring a region against a user's intention in an image.

BACKGROUND ART

When an image is utilized for creating a content, a region against a user's intention may be present in the image. Specific exemplary regions against a user's intention may include scratch, contamination, and unintentionally captured person. When the image including such a region is utilized for creating a content without being restored, a reduction in content quality or a violation of privacy can be caused. In order to solve the problem, the user may use the image from which a region against the user's intention is removed and in which the removed region is restored without a feeling of strangeness, for creating a content.

The restoration will be described in more detail with reference to FIG. 20. FIG. 20 is an explanatory diagram showing a method for restoring a region against a user's intention. In FIG. 20, an image 2000 indicates an image before image restoration and an image 2002 indicates an image after image restoration. For example, when a region 2001 in the image 2000 is against a user's intention, an image user removes the region 2001 from the image 2000 and then restores the removed part according to a surrounding image, like 2003. The thus-restored image is utilized thereby to solve the above problem.

In order to restore an image in this way, a method for utilizing a set of pixels (which will be called patch below) included in a region in an image is effective. In the following description, a region to be restored in an image (that is, a region against a user's intention) is denoted as defect region and an image including a defect region is denoted as defect image. A region other than the defect region in the defect image (that is, a region in the image not including a defect region) is denoted as non-defect region. In the method utilizing a patch, a pixel value of a certain part of a non-defect region in an image is attached to a portion to be restored in a defect region, thereby restoring the image.

The method for restoring an image having a defect region by use of a patch will be described in more detail with reference to FIG. 21 and FIG. 22. FIG. 21 is an explanatory diagram showing an image before restoration. FIG. 22 is an explanatory diagram showing an image after restoration. There will be specifically described below a process in which an image 102 including a region 101 to be restored is restored to an image 105 shown in FIG. 22. A portion 103, a portion 106 and a portion 107 are present as defect regions and a portion 104, a portion 108 and a portion 109 are present as non-defect regions in the image 102 in FIG. 21. At first, a pixel value of the portion 104 as a non-defect region is corresponded to the portion 103 as a defect region in the image 102. The portion 104 is used to restore the portion 103, thereby obtaining the image 105 in which part of the defect region 101 is restored. The process is repeated until a defect region disappears, thereby obtaining a restored image 110 as in FIG. 22.

In the following description, a small region including a portion to be restored (that is, a defect region) in an image will be denoted as defect patch like the portion 103, and a small region utilized for restoring a portion to be restored in a defect patch will be denoted as reference patch like the portion 104. The reference patch is a region which corresponds to a range in which a defect patch is to be restored, and which does not include a defect region. The defect patch may be the portion 106 or the portion 107 as a candidate in addition to the portion 103. In the following description, the candidates will be described as defect patch candidates. Similarly, the reference patch may be the portion 108 or the portion 109 as a candidate in addition to the portion 104. In the following description, the candidates will be denoted as reference patch candidate.

A method described in Non-Patent Literature 1 is known as a technique utilizing a patch, for example. The method described in Non-Patent Literature 1 is such that a defect patch and a restoration order are determined based on a luminance gradient of a non-defect region, and the like, from among defect patch candidates defined only on the border with the defect region. A reference patch is determined between the determined defect patch and the reference patch candidates based on a similarity obtained from a difference between the pixel values in the non-defect region. In the following, the processings are sequentially performed to restore an image.

The method described in Non-Patent Literature 1 will be described in more detail with reference to FIG. 23. FIG. 23 is an explanatory diagram for explaining the method described in Non-Patent Literature 1. When a defect image such as an image 300 in FIG. 23 is present, in the method described in Non-Patent Literature 1, at first a defect patch to be restored is selected based on information such as luminance gradient of a non-defect region from among the defect patch candidates defining only on the border with the defect region. Specifically, a defect patch 301 to be restored is selected from among the patch 301, a patch 302 and a patch 303 as the patch candidates in the defect region based on the information such as luminance gradient of a non-defect region.

Then, similarities between the defect patch 301 and the reference patch candidates (such as a patch 304, a patch 305 or a patch 306) are calculated to select the patch 304 having the highest similarity. The similarity is defined such that a reference patch having a closest pattern to a non-defect region of the defect patch 301 has a high value. Specifically, the similarity is defined by the square sum of a difference in pixel value between the pixels in a non-defect region in the defect patch 301 and the pixels in the reference patch corresponding thereto. Last, the pixel value of the pixels in the non-defect region in the defect patch 301 is replaced with the pixel value of the selected reference patch 304 thereby to obtain an image 307. The above processings are repeated until a defect region disappears, thereby obtaining a restored image.

FIG. 24 is an explanatory diagram for explaining pixels in a reference patch corresponding to pixels in a defect patch. The pixels in the reference patch corresponding to the pixels in the defect patch mean that when a defect patch 2101 and a reference patch 2102 each configured of 5×5 pixels are present, a pixel corresponding to a pixel 2103 is a pixel 2104 and a pixel corresponding to a pixel 2105 is a pixel 2106.

A method described in Non-Patent Literature 2 is known as an improved method of the method in Non-Patent Literature 1. The method described in Non-Patent Literature 2 is such that a similarity between the selected defect patch and the selected reference patch is also considered in addition to a luminance gradient when a defect patch is selected.

CITATION LIST

Non Patent Literature

NPL 1: A. Criminisi, P. Perez, and K. Toyama, "Region filling and object removal by exemplar-based image inpainting" IEEE Trans. Image Processing, vol. 13, no. 9, pp. 1200-1212, 2004.
NPL 2: B. Li, Y. Qi, and X. Shen, "An image Inpainting Method," IEEE Conf. Computer Aided Design and Computer Graphics, pp 531-536, 2005.

SUMMARY OF INVENTION

Technical Problem

Both the techniques described in Non-Patent Literature 1 and Non-Patent Literature 2 use only a pixel value of a reference patch candidate and a pixel value of a non-defect region in a defect patch candidate to determine a restoration order, or a similarity between the defect patch candidate and the reference patch candidate. Thus, in comparing the non-defect region in the defect patch with the region in the reference patch corresponding thereto, when a plurality of reference patch candidates having a similar pattern to the non-defect region in the defect patch are present, the reference patch candidates cannot be discriminated. Thus, a reference patch which can collapse a restored image can be selected from the reference patch candidates. The collapsed restored image means an image having a different structure from that estimated from outside the defect region.

FIG. 25 and FIG. 26 are explanatory diagrams for explaining a case in which a reference patch which can collapse a restored image is selected. A defect image shown in FIG. 25 includes a defect region 401. When the method described in Non-Patent Literature 1 is used to perform image restoration on the image, a collapsed restored image shown in FIG. 26 is generated.

A cause for the collapsed restored image will be described below in more detail with reference to FIG. 27. FIG. 27 is an explanatory diagram showing the process in which a collapsed restored image is generated from a defect image. In FIG. 27, it is assumed that a defect region 601 is included in a defect image like FIG. 25. When image restoration is performed by the method described in Non-Patent Literature 1, at first a defect patch 602 is selected as a region to be restored, based on a luminance gradient in the image. Then, a reference patch is selected for restoring the defect region in the defect patch 602. It is assumed herein that a patch 603 and a patch 604 are reference patch candidates.

FIG. 28 is an explanatory diagram showing enlarged patches. In FIG. 28, the defect patch 602, and the patch 603 and the patch 604 as the reference patch candidates, which are shown in FIG. 27 and are enlarged, are denoted as a defect patch 602a, a reference patch candidate 603a, and a reference patch candidate 604a, respectively. In this case, a non-defect region 602b in the defect patch 602a is similar to the region 603 in the reference patch candidate 603a in their patterns and a non-defect region 602b in the defect patch 602a is similar to the region 604b in the reference patch candidate 604a in their patterns.

With the method described in Non-Patent Literature 1, in selecting a reference patch used for restoration, a defect patch and the reference patch candidates are compared with each other, and a reference patch is determined only by the similarity of the pattern in the corresponding non-defect region. Thus, in the case of FIG. 28, both the reference patch candidate 603 and the reference patch candidate 604 are highly likely to be selected as the patches used for restoration. However, when the reference patch candidate 604 is selected as a reference patch and the reference patch candidate 604 is used to restore a defect region in the defect patch 602, the restored image can be collapsed like the image 605 in FIG. 27.

Therefore, it is an exemplary object of the present invention to provide an image restoration system, an image restoration method and an image restoration program capable of restoring an image in which a region against a user's intention is present, without collapse.

Solution to Problem

According to an exemplary aspect of the present invention, there is provided an image restoration system including: a defect pixel value estimation means that estimates a pixel value which each pixel in a defect region as a region to be restored in an image may take, based on a pixel value of pixels in a non-defect region as a region in the image not including the defect region; a patch selection means that selects a pair of patches in which a defect patch and a reference patch are most similar to each other from among the pairs of patches including the defect patch as an image of a region including the defect region and the reference patch as an image of a region not including the defect region; and an image restoration means that restores the defect patch based on the reference patch in the selected pair of patches, wherein the patch selection means selects a pair of patches in which an image of a defect patch and an image of a reference patch are most similar to each other, based on a relationship between an estimated pixel value of a defect region in the defect patch and a pixel value of the corresponding reference patch.

The image restoration method according to an exemplary aspect of the present invention is characterized in that a pixel value which each pixel in a defect region as a region to be restored in an image may take is estimated based on a pixel value of pixels in a non-defect region as a region in an image not including a defect region, a pair of patches in which a defect patch and a reference patch are most similar to each other is selected from pairs of patches including a defect patch as an image of a region including a defect region and a reference patch as an image of a region not including a defect region, a pair of patches in which an image of the defect patch and an image of the reference patch are most similar to each other is selected based on a relationship between a pixel value of the defect region estimated in the defect patch and a pixel value of the corresponding reference patch, and the defect patch is restored based on the reference patch in the selected pair of patches.

According to an exemplary aspect of the present invention, there is provided an image restoration program for causing a computer to perform: a defect pixel value estimation processing of estimating a pixel value which each pixel in a defect region as a region to be restored in an image may take, based on a pixel value of pixels in a non-defect region as a region in the image not including the defect region; a patch selection processing of selecting a pair of patches in which a defect patch and a reference patch are most similar to each other from among the pairs of patches including the defect patch as an image of a region including the defect region and the reference patch as an image of a region not including the defect region; and an image restoration processing of restoring the defect patch based on the reference patch in the selected pair of patches, wherein in the patch selection processing, a pair of patches in which an image of a defect patch and an image of a reference patch are most similar to each other based on a relationship between an estimated pixel value of a defect region in the defect patch and a pixel value of the corresponding reference patch.

Advantageous Effects of Invention

According to the present invention, it is possible to restore an image in which a region against a user's intention is present without collapse.

DESCRIPTION OF EMBODIMENTS

Exemplary embodiments according to the present invention will be described below with reference to the drawings.

First Exemplary Embodiment

Figure 1:
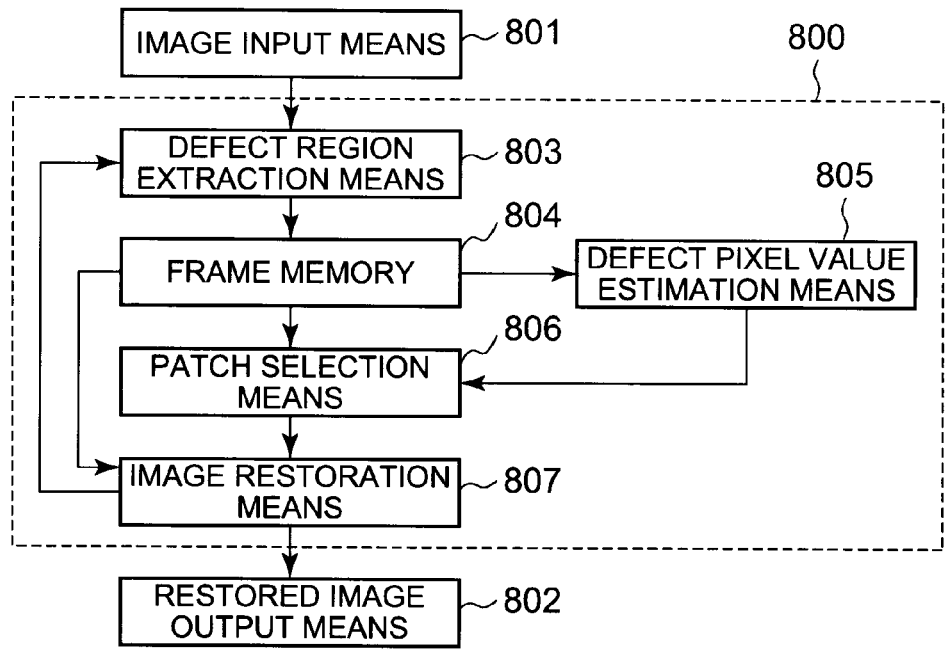
FIG. 1 It depicts a block diagram showing an exemplary image restoration system according to a first exemplary embodiment of the present invention.

FIG. 1 is a block diagram showing an exemplary image restoration system according to a first exemplary embodiment of the present invention. The image restoration system according to the present exemplary embodiment includes a computer 800 operating under program control, an image input means 801, and a restored image output means 802.

The means schematically operate as follows. The image input means 801 inputs an image (defect image) including a defect region into the computer 800 in response to a user's instruction, for example. The image input means 801 is realized by an input device such as scanner. A defect image to be input into the image input means 801 may be a defect image in which a defect region is previously designated by a marker such that the defect region is conspicuous.

Alternatively, when an input image is a RGB image represented by a RGB (Red-Green-Blue color model) signal and a pixel value of a defect region is defined as (R, G, B)=(255, 0, 0), for example, the image input means 801 may receive the defect image in which the pixel value is given to the pixels in the defect region and may input it into the computer 800. Alternatively, the image input means 801 may receive a binary mask image indicating whether a region is a defect region together with the image (defect image) including a defect region, and may input them into the computer 800. A pixel in the defect image may be denoted as pixel i in the following description.

The restored image output means 802 outputs an image restored by the computer 800. The image input means 801 is realized by an output device such as display.

The computer 800 includes a defect region extraction means 803, a frame memory 804, a defect pixel value estimation means 805, a patch selection means 806, and an image restoration means 807.

The defect region extraction means 803 extracts pixels in a defect region from an image input into the image input means 801 or an image restored by the image restoration means 807 described later. That is, the defect region extraction means 803 extracts a defect region from a defect image. For example, when a defect image in which a defect region is previously designated by a marker or the like is input, the defect region extraction means 803 may extract the defect region from the defect image based on a value for identifying a marker color stored in an image storage means (not shown) in the computer 800, for example. Specifically, when the pixel value of the defect region designated by the marker is defined as a RGB signal of (R, G, B)=(255, 0, 0), the defect region extraction means 803 may extract pixels having the pixel value as the defect region.

When a defect region is not designated by the user, the defect region extraction means 803 may automatically detect a region against the user's intention in the image and may extract the region as a defect region. More specifically, the defect region extraction means 803 may recognize an object by use of an image division technique, a general object recognition technique or a specific object recognition technique, for example, and may determine a defect region based on the pixels included in the object. Alternatively, the defect region extraction means 803 may perform a processing of extracting a noise or blur in the image thereby to extract a region in which a noise or blur occurs in the input defect image and to assume the region as a defect region.

Figure 2:
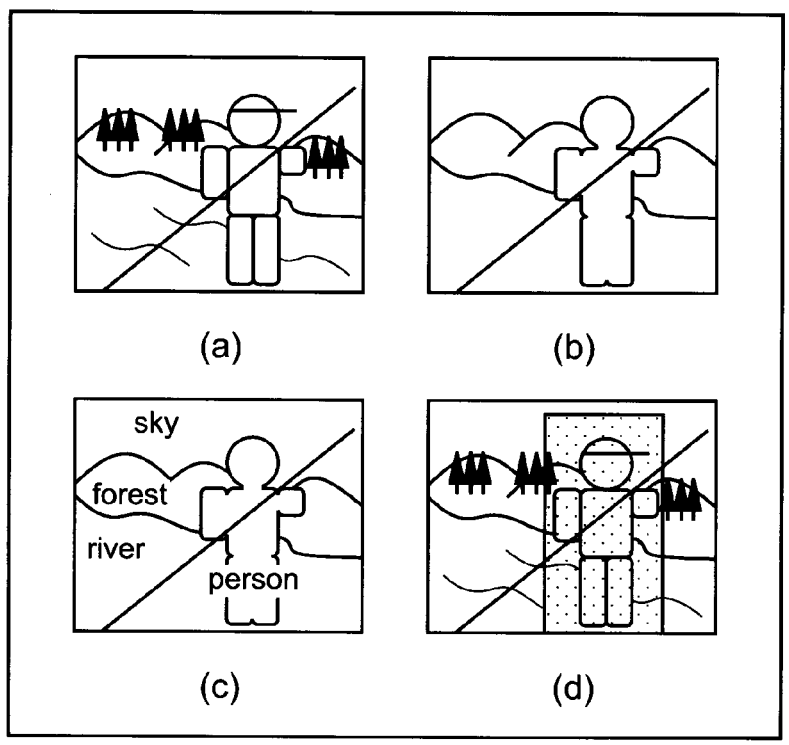
FIG. 2 It depicts an explanatory diagram showing exemplary processings used for extracting a defect region from an input image.

The image division technique, the general object recognition technique and the specific object recognition technique will be described below with reference to FIG. 2. FIG. 2 is an explanatory diagram showing exemplary processings used for extracting a defect region from an input image. The image division technique will be described first. The image division technique is a technique for grouping pixels which seem to be mutually related, based on information of pixels' colors in an image exemplified in FIG. 2(a) and dividing a region as exemplified in FIG. 2(b). The image division technique may be "interactive Graph Cuts" or the like.

The general object recognition technique is a technique for causing a computer to recognize, with typical names, objects included in an image of a constraint-free real world scene. The general object recognition technique is a technique for causing a computer to recognize an image exemplified in FIG. 2(a) as "person", "river", "forest", "sky" and the like as exemplified in FIG. 2(c). Specific methods to which the general object recognition technique is applied may include a method for learning an arrangement relationship between regions in a natural scene image, automatically constructing a template per class, and discriminating an image based on the automatically constructed template.

The specific object recognition technique is a technique for causing a computer to recognize the image exemplified in FIG. 2(a) as an image in which a specific object (person, herein) is present in a certain part (a shaded region in the present example) as exemplified in FIG. 2(d). The specific object recognition technique is a technique not for causing a computer to recognize the total objects like the general object recognition technique but for causing a computer to recognize specific objects such as person. Specific methods to which the specific object recognition technique is applied may include a method for detecting a person by use of a histogram (HOG: Histograms of Oriented Gradients) of a contrast-changing part such as an outline of photographed object.

A processing of extracting a noise or blur in an image will be described below. The processing of extracting a noise in an image may include a method to which a filter (that is, high-pass filter) for extracting a high frequency component of an image is applied. A blurred region in the image is characterized by less high frequency component than in other regions. Thus, a blur in the image can be extracted by applying a highpass filter to the image and assuming a region having less high frequency component as a blurred region.

The frame memory 804 stores information indicating a defect image input into the defect region extraction means 803 and an extracted defect region. The frame memory 804 may use a method for storing pixels in a defect region, for example, as a method for storing information indicating a defect region in a defect image. Alternatively, the frame memory 804 may store a mask image binarized depending on whether a region is defective. The frame memory 804 is realized by a magnetic disc device provided in the computer 800, for example.

The defect pixel value estimation means 805 estimates a pixel value which each pixel in a defect region in an image may take based on a pixel value of pixels in a non-defect region. The pixel value estimation method may use a method for calculating a probability distribution of a pixel value per pixel, for example. That is, the defect pixel value estimation means 805 may calculate a probability distribution of a pixel value per pixel and may estimate a pixel value at which a probability derived from the probability distribution is highest as a pixel value of pixels in a defect region.

The defect pixel value estimation means 805 may calculate a probability distribution by configuring a probability distribution function such as Gaussian probability distribution function or blend Gaussian distribution function from an average and a dispersion of pixel values in a non-defect region present in a small region ψ having a certain size centering on the pixel i in the defect region, for example. Specifically, a plurality of pixels belonging to the non-defect region are present in the small region ψ. The defect pixel value estimation means 805 calculates an average μ and a dispersion (covariance matrix) ^ of the pixel values x of the pixels. The defect pixel value estimation means 805 may configure the Gaussian probability distribution exemplified in the following Formula 1 and define a probability distribution of the pixel values x based on the calculated average μ and dispersion ^.

[Math. 1]

$$p(x) = \frac{1}{(2\pi)^{3/2}\sqrt{|\Lambda|}} \exp[-(x-\mu)^t \Lambda^{-1}(x-\mu)] \quad \text{(Formula 1)}$$

When a non-defect region is not present in the small region ψ, the defect pixel value estimation means 805 may estimate all the pixel values as equal probability.

In calculating a blend Gaussian distribution, the defect pixel value estimation means 805 classifies a set of pixel values into several groups and calculates an average $\mu_i$ and a dispersion (covariance matrix) ^ of the pixel values $x_i$ of the pixels in the group. Herein, i is an identifier for identifying a group. The defect pixel value estimation means 805 may configure a blend Gaussian distribution exemplified in the following Formula 2 and define a probability distribution of the pixels x based on the calculated average $\mu_i$ and dispersion $\hat{\ }_i$.

[Math. 2]

$$p(x) = \sum_i \frac{\tau_i}{(2\pi)^{3/2}\sqrt{|\Lambda_i|}} \exp[-(x-\mu_i)^t \Lambda_i^{-1}(x-\mu_i)] \quad \text{(Formula 2)}$$

where $\tau_i$ is a coefficient defined per classified group and meets a relationship in the following Formula 3.

[Math. 3]

$$\sum_i \tau_i = 1 \quad \text{(Formula 3)}$$

In addition, the defect pixel value estimation means 805 may radially sample the pixel values of the pixels in the non-defect region per specific direction from the pixel i in the defect region and may calculate a probability distribution such as Gaussian probability distribution function or blend Gaussian distribution function based on the sampled pixel values. Then, the defect pixel value estimation means 805 may estimate the pixel value based on the thus-calculated probability distribution. The defect pixel value estimation means 805 may calculate a probability distribution based on the average and the dispersion of the sampled pixel values similarly as in the above case.

In addition, the defect pixel value estimation means 805 may sample a plurality of pixels in the non-defect region according to a specific rule (such as random extraction) based on the pixel i in the defect region and may calculate a probability distribution function such as Gaussian probability distribution function or blend Gaussian distribution function based on the sampled pixel values.

Alternatively, the defect pixel value estimation means 805 may perform an image division processing or object recognition processing to analyze which object is shot in the non-defect region, thereby calculating a probability distribution based on the analyzed information.

Figure 3:
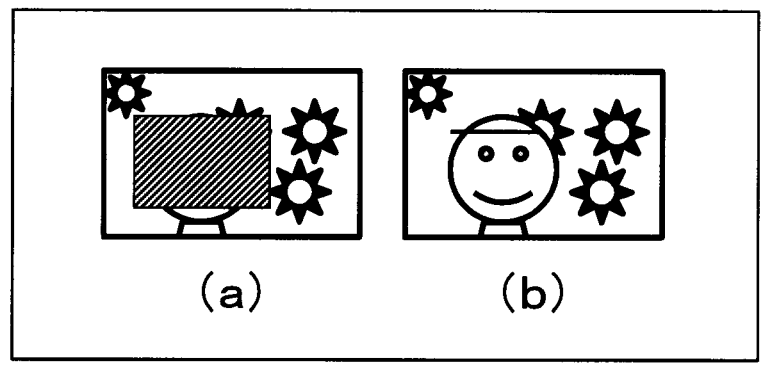
FIG. 3 It depicts an explanatory diagram showing an exemplary method for calculating a probability distribution based on analyzed information.

A method for calculating a probability distribution based on analyzed information will be described below with reference to FIG. 3. FIG. 3 is an explanatory diagram showing an exemplary method for calculating a probability distribution based on analyzed information. For example, it is assumed that a person's face is turned out to be present in the defect region as a result of the analysis of the image in the non-defect region in the image exemplified in FIG. 3(*a*). Further, it is assumed that the pixel value of the defect region when the image shows a person's face therein is a pixel value indicated by the image exemplified in FIG. 3(*b*), for example. At this time, the defect pixel value estimation means 805 may define a probability distribution function of the pixel value x in the defect region by a Gaussian function exemplified in the following Formula 4 with the parameters of the average $\mu$ and the dispersion $\hat{\ }$ of the pixel values in FIG. 3(*b*).

[Math. 4]

$$p(x) = \frac{1}{(2\pi)^{3/2}\sqrt{|\Lambda|}} \exp[-(x-\mu)^t \Lambda^{-1}(x-\mu)] \quad \text{(Formula 4)}$$

The dispersion $\hat{\ }$ exemplified in the Formula 4 is a constant and is determined to be smaller when the pixel value of the image to be compared (the image exemplified in FIG. 3(*b*), herein) is more probable.

The patch selection means 806 selects a pair of defect patch and reference patch used for restoration, and stores the value in a memory (not shown). Specifically, the patch selection means 806 selects a pair of reference patch and defect patch in which the images (pixel values) are most similar to each other. That is, the patch selection means 806 selects a pair of reference patch and defect patch which is more similar to the structure of the image in the defect region.

In the following description, there will be described a case in which a patch selection function $E(\psi p, \psi q)$ is used for the method for selecting a pair of patches. The patch selection function $E(\psi p, \psi q)$ is a function for determining in which defect patch $\psi p$ to restore a defect region, and then with which reference patch $\psi q$ to restore a defect region. When the number of defect patch candidates is N and the number of reference patch candidates is M, the patch selection function $E(\psi p, \psi q)$ has MN pairs of arguments and takes a smaller value as a pair of patches is more suitable for the restoration. That is, the patch selection means 806 calculates the patch selection function $E(\psi p, \psi q)$ with a pair of defect patch candidate $\psi p$ and reference patch candidate $\psi q$ as arguments, selects a pair $(\psi p0, \psi q0)$ having the smallest value of the patch selection function, and stores $(\psi p0, \psi q0)$ in the memory (not shown). Herein, the defect patch candidate $\psi p$ and the reference patch candidate $\psi q$ indicate a set of pixels in a small region including the pixels p and q in the defect image. The patch selection means 806 divides an image including a defect region at equal intervals to determine whether a defect region is included in each region, and classifies a region including a defect region as defect patch candidate $\psi p$ and a region not including a defect region as reference patch candidate $\psi q$, respectively.

Figure 4:
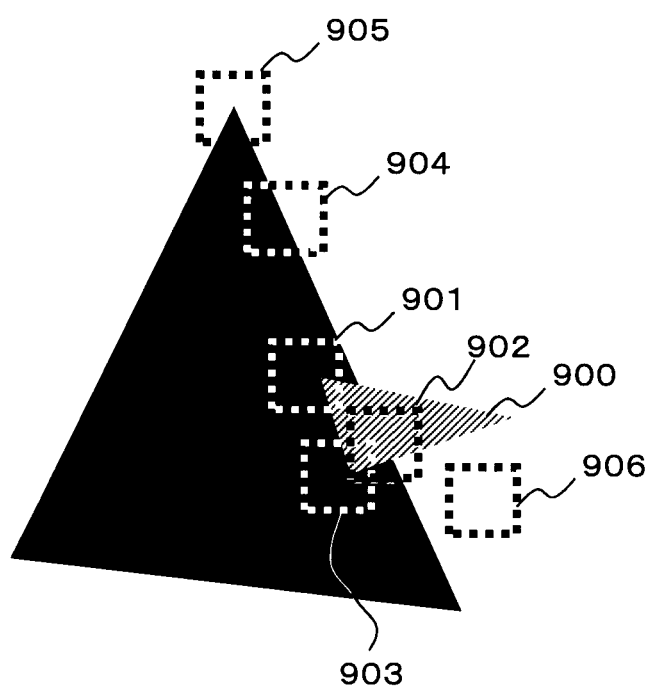
FIG. 4 It depicts an explanatory diagram showing exemplary defect patch candidates and exemplary reference patch candidates.

The defect patch candidates $\psi p$ and the reference patch candidates $\psi q$ will be described in more detail with reference to FIG. 4. FIG. 4 is an explanatory diagram showing exemplary defect patch candidates and exemplary reference patch candidates. In the example shown in FIG. 4, it is assumed that a region 900 is a defect region. At this time, patches 901, 902 and 903 are the defect patch candidates, and patches 904, 905 and 906 are the reference patch candidates.

Herein, the patch selection function $E(\psi p, \psi q)$ is defined as a function including a function $A(\psi p)$ defined based on the defect patch candidate $\psi p$ and a function $B(\psi p, \psi q)$ defined based on the defect patch candidate $\psi p$ and the reference patch candidate $\psi q$.

The function $A(\psi p)$ takes a smaller value as a luminance gradient of the defect patch candidate $\psi p$ is larger. Specifically, the function $A(\psi p)$ is defined based on a luminance gradient or a dispersion of the pixel values in the non-defect region. For example, a value of the function $A(\psi p)$ is determined based on structure information of the defect patch candidate $\psi p$, and the reciprocal of the square sum of the luminance gradient in the pixels of the non-defect region in the defect patch candidate $\psi p$ may be defined as the function $A(\omega p)$. Alternatively, the reciprocal of the square sum of the vector product of a luminance gradient vector of the defect image at the pixel i in the non-defect region in the defect patch candidate ωp and a gradient vector of the mask image stored in the frame memory 804 may be defined as the function A(ψp).

The function B(ωp, ωq) takes a smaller value as the image of the defect patch candidate ψp and the image of the reference patch candidate ψq are more similar to each other. That is, a value of the function B(ψp, ψq) indicates a similarity between the image of the defect patch and the image of the reference patch. A value of the function B(ψp, ψq) is calculated based on the probability distribution of the pixel values of the pixels in the defect region stored in the defect pixel value estimation means 805, and the pixel values of the non-defect region in the defect patch candidate ψp and in the reference patch candidate ψq.

There will be described an example in which the patch selection means 806 defines the function B(ψp, ψq). At first, the patch selection means 806 selects a pixel value (which may be denoted as maximum likelihood value) having the highest probability indicated by the probability distribution function for the pixels belonging to the defect region in the defect patch candidate ψp, and selects an already-obtained pixel value for the pixels belonging to the non-defect region in the defect patch candidate ψp. Then, the patch selection means 806 may define the square sum of the difference between the selected pixel value and the pixel value of the corresponding reference patch candidate ψq as the function B(ψp, ψq).

There will be further described other example in which the patch selection means 806 defines the function B(ψp, ψq). At first, the patch selection means 806 selects a pixel value having the highest probability indicated by the probability distribution function for the pixels belonging to the defect region in the defect patch candidate ωp, and selects the already-obtained pixel value for the pixels belonging to the non-defect region in the defect patch candidate ψp. Then, the patch selection means 806 may define, as the function B(ψp, ψq), a value which is obtained by subjecting the square sum of the difference between the selected pixel value and the pixel value of the corresponding reference patch candidate ψq to weighted average with a dispersion value of the probability distribution function of the estimation values of the pixels defined by the defect pixel value estimation means 805 as weights.

There will be further described other example in which the patch selection means 806 defines the function B(ψp, ψq). At first, the patch selection means 806 calculates the square of the difference in pixel value between the pixels belonging to the non-defect region in the defect patch candidate ψp and the pixels in the corresponding reference patch candidate ψq. Then, the patch selection means 806 calculates the square of the logarithmic value of the probability which may take the pixel value of the pixels in the corresponding reference patch candidate ψq based on the probability distribution of the pixel values estimated by the defect pixel value estimation means 805. Then, the patch selection means 806 may define the total of the values as the function B(ψp, ψq).

The method for defining the function B(ψp, ψq) by the patch selection means 806 is not limited to the above methods. The patch selection means 806 may define a function such that the function B (ψp, ψq) takes a smaller value as the image of the defect patch candidate yip and the image of the reference patch candidate ψq are more similar to each other.

The patch selection function E(ψp, ψq) is expressed as the product or sum of the function A(ψp) and the function B(ψp, ψq), and the patch selection means 806 selects a pair of patches having the smallest value of the patch selection function E(ωp, ψq) as a pair of patches to be restored.

The thus-defined function A(ψp) is a function for selecting a candidate having a lower possibility of collapsing the restored image. The thus-defined function B(ψp, ψq) is a function for selecting more similar patches from among the defect patch candidates yip and the reference patch candidates ψq. Thus, the patch selection function E(ψp, ψq) expressed as the product or sum thereof may be a function for replacing the defect region with a candidate closer to the structure estimated as the original region.

There will be described other method by which the patch selection means 806 configures the patch selection function E(ψp, ψq). When configuring the patch selection function, the patch selection means 806 uses the image division technique, the general object recognition technique, the specific object recognition technique or the like to analyze a texture or object in a defect image. Then, the patch selection means 806 configures the patch selection function E (ψp, ψq) such that the value is smaller as the same textures are more contained between the defect patch and the reference patch (such that the value is larger as the same textures are less contained). Specifically, the patch selection means 806 defines sets of textures or objects in the defect patch and the reference patch. Then, the patch selection means 806 may define the patch selection function E(ψp, ψq) such that the value is larger as the sets are more different from each other.

There has been described in the above description the case in which the defect pixel value estimation means 805 calculates a probability distribution function to estimate a pixel value of a defect region and the patch selection means 806 calculates a patch selection function based on the probability distribution function. In addition, the defect pixel value estimation means 805 may estimate a pixel value of pixels in a defect region based on a pixel value of pixels in a non-defect region by an interpolation processing such as Bilinear interpolation or Bicubic interpolation, instead of calculating the probability distribution function. Then, the patch selection means 806 may configure the patch selection function by the value. Alternatively, the patch selection means 806 may use the method described in the following reference document to estimate a pixel value of a defect region and may use the value to configure the patch selection function.

REFERENCE DOCUMENT

M. Bertalmio, A. L. Bertozzi, and G. Sapiro, "Navier-stokes, fluid dynamics, and image and video inpainting", Conf. CVPR, pp. 355-362, 2001

When calculating a probability distribution function or pixel value of each pixel by the above methods, the defect pixel value estimation means 805 may calculate the probability distribution function or pixel value by use of an image obtained by down-sampling a defect image, and may apply the image to an up-sampled defect image.

As described above, the patch selection means 806 compares the pixel value of the defect region estimated by the defect pixel value estimation means 805 with the pixel value of the corresponding reference patch, and selects a pair of patches in which the images are more similar to each other. Thus, when a reference patch to be used for restoration is selected, a pixel value of the pixels in the defect region is predicted so that the amount of information for comparing the defect patch with the reference patch further increases than the comparison method only between the defect region and the non-defect region in the defect patch. Thus, a more suitable reference patch can be selected.

The image restoration means 807 uses the defect patch ψp0 and the reference patch ψq0, which are selected by the patch selection means 806, to restore the pixel value of the pixels in a defect region in the defect patch ψp0. The image restoration means 807 may simply replace the pixels in the defect region in the defect patch with the pixel value of the pixels in the reference patch for restoration, for example. The image restoration means 807 may use a method such as α blending based on the pixel value of the reference patch to restore the border between the defect region and the non-defect region in the defect patch. Alternatively, the image restoration means 807 may use part of the region in the reference patch, instead of the entire region in the reference patch, for the defect region in the defect patch when restoring the image.

Figure 5:
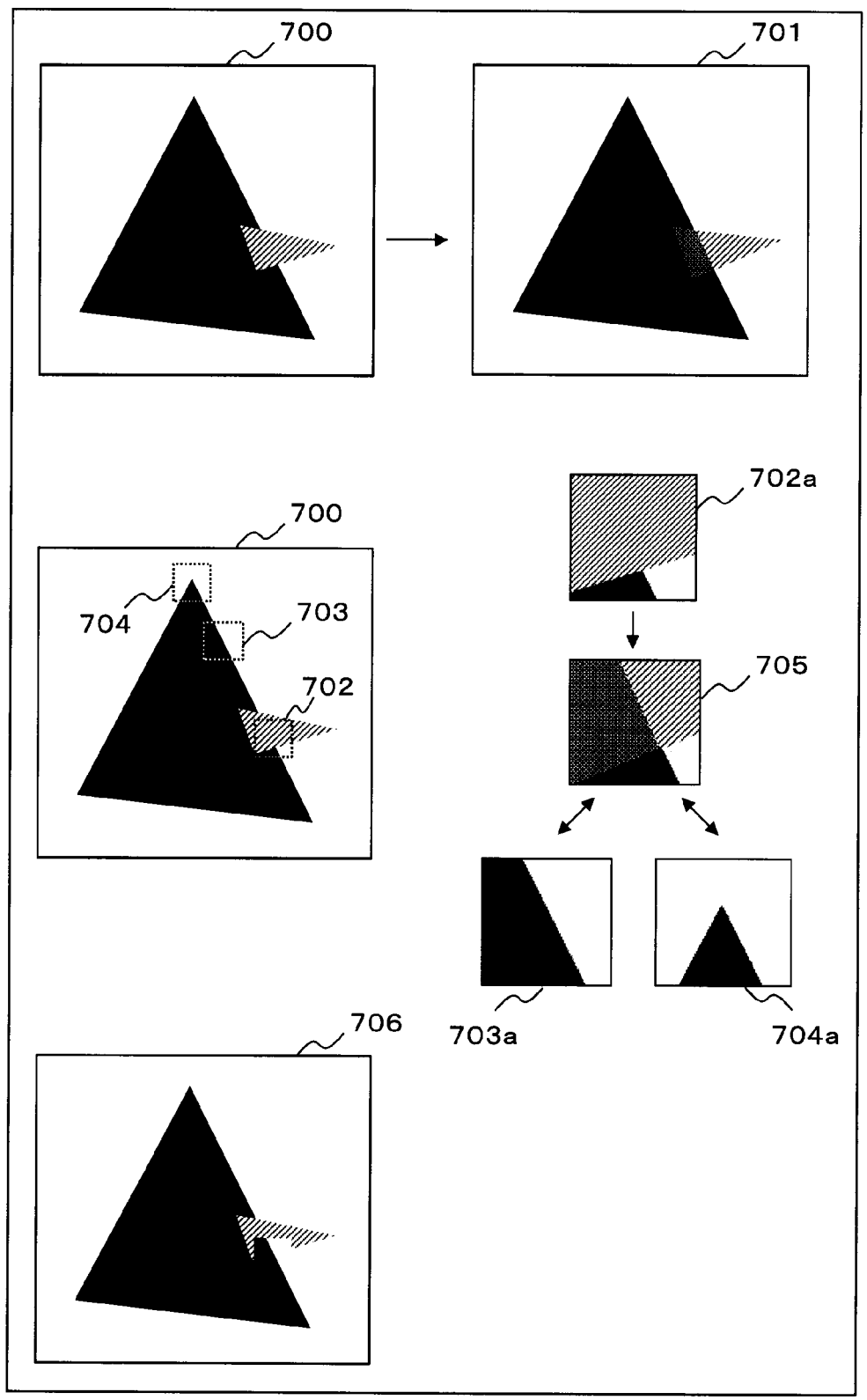
FIG. 5 It depicts an explanatory diagram showing an exemplary method for selecting a reference patch.
Figure 27:
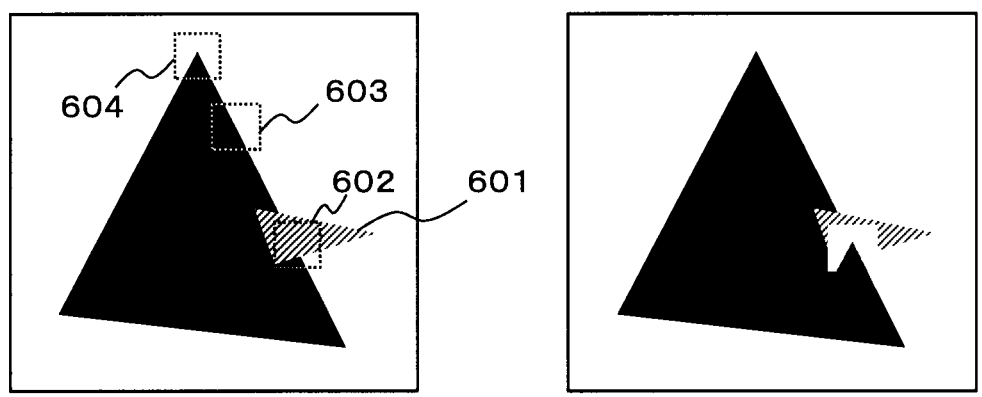
FIG. 27 It depicts an explanatory diagram showing a process in which a collapsed restored image is generated from a defect image.
Figure 28:
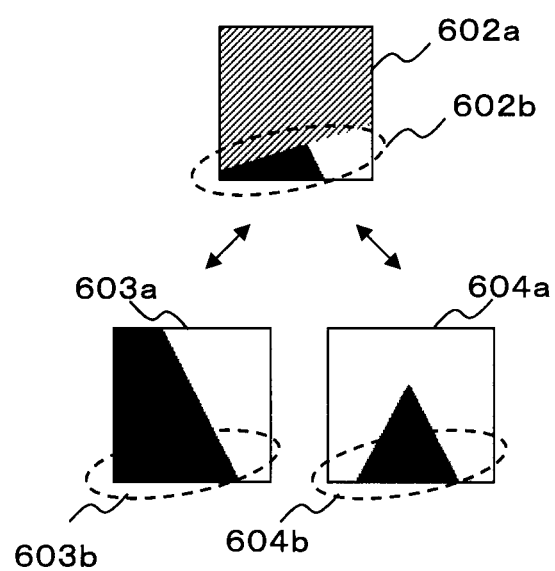
FIG. 28 It depicts an explanatory diagram showing enlarged patches.

There will be further described with reference to FIG. 5 a method by which the patch selection means 806 selects a pair of patches to be restored by the estimated pixel value. FIG. 5 is an explanatory diagram showing an exemplary method for selecting a reference patch. An image 700 includes a defect region as in FIG. 27. An image 701 is a pattern obtained by previously estimating a pixel value in a defect region. A region 702 is a defect patch, and a region 703 and a region 704 are reference patch candidates. The enlarged regions thereof area region 702a, a region 703a and a region 704, and the region 702, the region 703 and the region 704 correspond to the region 702a, the region 703a and the region 704a, respectively. A pattern 705 is an image indicating a pixel value estimated in the region 702.

The patch selection means 806 compares the estimated pattern 705 with the reference patch candidates 703 and 704. Thus, the reference patch candidate 704 which can collapse the image after restoration is prevented from being selected as a reference patch, and the reference patch candidate 703 is selected as a reference patch. The patch selection means 806 uses the thus-selected reference patch 703 to restore the image 700, thereby generating an image without collapse, unlike an image 706.

The defect region extraction means 803, the defect pixel value estimation means 805, the patch selection means 806 and the image restoration means 807 are realized by the CPU in the computer operating according to a program (image restoration program). For example, the program may be stored in a storage unit (not shown) in the computer 800, and the CPU may read the program and operate as the defect region extraction means 803, the defect pixel value estimation means 805, the patch selection means 806 and the image restoration means 807 according to the program. The defect region extraction means 803, the defect pixel value estimation means 805, the patch selection means 806 and the image restoration means 807 may be realized in dedicated hardware, respectively.

Figure 6:
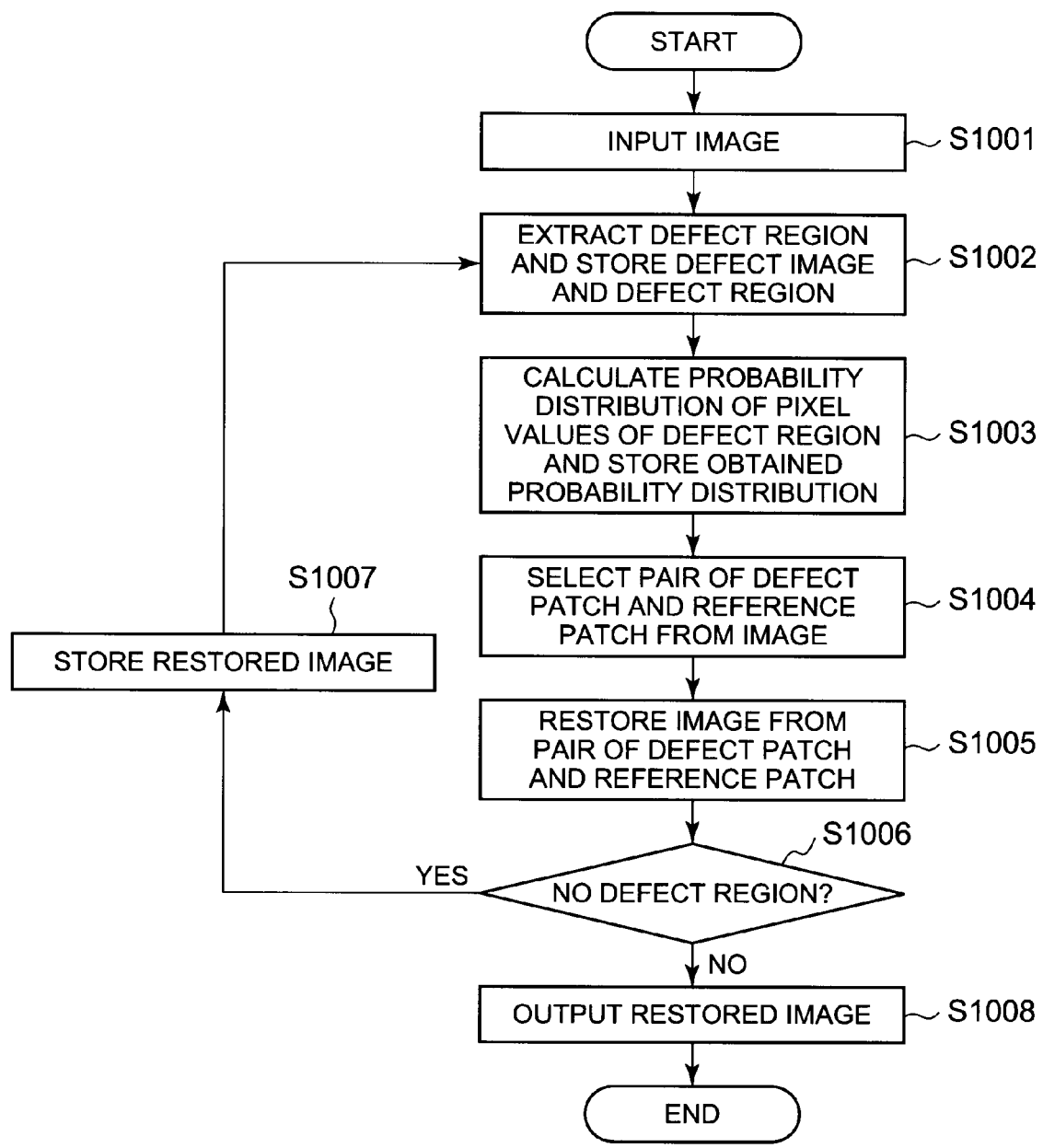
FIG. 6 It depicts a flowchart showing exemplary operations of the image restoration system according to the first exemplary embodiment.

The operations will be described below. FIG. 6 is a flowchart showing exemplary operations of the image restoration system according to the present exemplary embodiment. The entire operations of the present exemplary embodiment will be described below with reference to the block diagram exemplified in FIG. 1 and the flowchart exemplified in FIG. 6.

At first, a reference image (defect image) is input into the image input means 801 (step S1001). Then, the defect region extraction means 803 extracts a defect region from the defect image input into the image input means 801 and stores the defect image and the defect region in the frame memory 804 (step S1002). The defect pixel value estimation means 805 estimates a pixel value of pixels in a defect region based on the information indicating the defect image and the defect region stored in the frame memory 804, and stores it in the memory (not shown) (step S1003). Specifically, the defect pixel value estimation means 805 calculates a probability distribution of the pixel values in the defect region and stores the calculated probability distribution. The patch selection means 806 uses the patch selection function to select a pair of defect patch and reference patch based on the information indicating the defect image and the defect region stored in the frame memory 804 and the estimation value of the pixel value estimated by the defect pixel value estimation means 805 (step S1004). Specifically, the patch selection means 806 selects a pair of defect patch and reference patch having the smallest patch selection function based on the pixel value of the defect region estimated by the defect pixel value estimation means 805 and the pixel value of the corresponding reference patch.

The image restoration means 807 restores the pixel value of the pixels belonging to the defect region in the selected defect patch by the pixel value of the pixels in the reference patch based on the pair of defect patch and reference patch selected by the patch selection means 806 and the defect image stored in the frame memory 804, and store the value in the memory (not shown) (step S1005). The image restoration means 807 determines whether a defect region disappears from the restored image (step S1006). When a defect region is present in other than the restored defect region (No in step S1006), the image restoration means 807 stores the restored image in an image storage means (not shown) (step S1007). The image restoration means 807 notifies the defect region extraction means 803 of the restored image. Subsequently, the defect region extraction means 803, the defect pixel value estimation means 805, the patch selection means 806 and the image restoration means 807 repeat the processings in step S1002 and subsequent steps.

On the other hand, when a defect region is not present in other than the restored defect region (Yes in step S1006), the image restoration means 807 outputs the restored image to the restored image output means 802 (step S1008). For example, the image restoration means 807 displays the recovered restored image on a display device.

The effects of the present exemplary embodiment will be described below. As described above, according to the present exemplary embodiment, the defect pixel value estimation means 805 estimates a pixel value which each pixel in the defect region in the image may take, based on the pixel value of the pixels in the non-defect region. The patch selection means 806 selects a pair of patches in which a defect patch and a reference patch are most similar to each from among the pairs of patches including the defect patch and the reference patch. When selecting a pair of patches, the patch selection means 806 compares the estimated pixel value of the defect region with the pixel value of the corresponding reference patch thereby to select a pair of patches in which the images are most similar to each other from among the pairs of patches. Then, the image restoration means 807 restores the defect patch based on the reference patch in the selected pair of patches. Thus, the restored image is prevented from being collapsed when the image in which a region against a user's intention is present is restored.

That is, according to the present exemplary embodiment, the defect pixel value estimation means 805 previously estimates the pixel value of the pixels in the defect region based on the pixel value of the pixels in the non-defect region. Then, the patch selection means 806 uses the estimated pixel value to determine a pair of defect patch and reference patch based on the patch selection function. The pixel value in the defect region is previously estimated in this way, thereby preventing patches by which the image can be collapsed from being selected as a pair of defect patch and reference patch. Thus, the restored image can be prevented from being collapsed when the image in which a region against a use's intention is present is restored.

In other words, the present invention is applicable to the image restoration processing and its effect is to prevent a patch which can collapse the restored image from being selected as a reference patch, thereby obtaining the restored image with a higher quality. This is because the pixel value in the defect region is previously estimated and the similarities between the defect patch candidates and the reference patch candidates are compared by the estimated amount (pixel value), thereby preventing the patch causing the collapse of the restored image from being selected as a reference patch, unlike the typical methods.

Second Exemplary Embodiment

Figure 7:
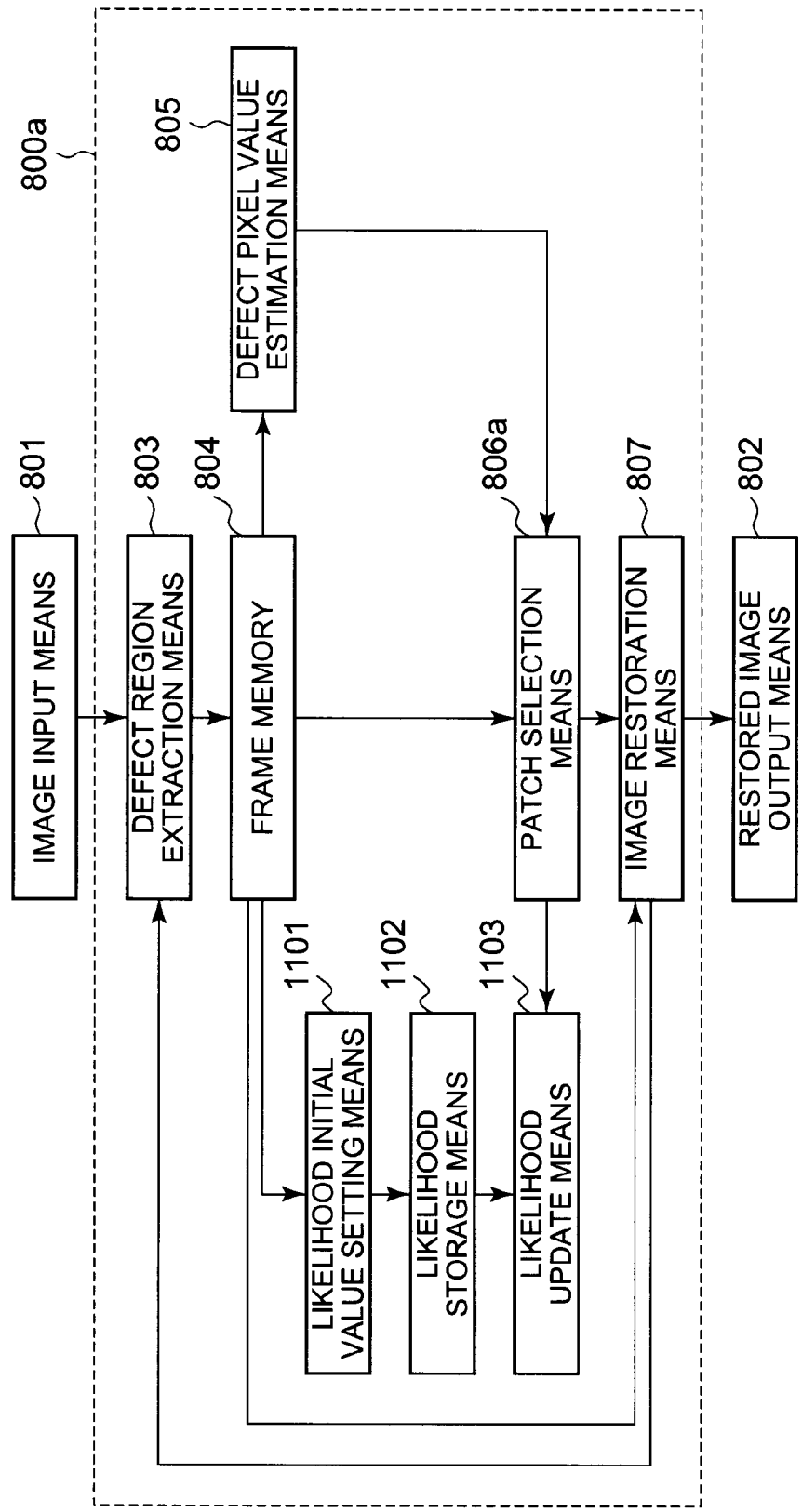
FIG. 7 It depicts a block diagram showing an exemplary image restoration system according to a second exemplary embodiment of the present invention.

FIG. 7 is a block diagram showing an exemplary image restoration system according to a second exemplary embodiment of the present invention. The same constituents as those in the first exemplary embodiment are denoted with the same reference numerals as those in FIG. 1, and a detailed explanation thereof will be omitted. An image processing system according to the second exemplary embodiment includes a computer $800a$, an image input means 801 and a restored image output means 802. The image input means 801 and the restored image output means 802 are the same as those in the first exemplary embodiment and thus an explanation thereof will be omitted.

The computer $800a$ includes a defect region extraction means 803, a frame memory 804, a defect pixel value estimation means 805, a patch selection means $806a$, an image restoration means 807, a likelihood initial value setting means 1101, a likelihood storage means 1102 and a likelihood update means 1103. The defect region extraction means 803, the frame memory 804, the defect pixel value estimation means 805 and the image restoration means 807 are the same as those in the first exemplary embodiment.

The likelihood initial value setting means 1101 sets a likelihood for each pixel based on the information indicating the defect image and the defect region stored in the frame memory 804. The likelihood is defined per pixel as the amount indicating a likelihood of a pixel value given to a pixel i in a defect image. A probability distribution function of the pixel values is approximately estimated based on the pixel value in a non-defect region and the restored pixel value, and the likelihood of the pixel in the defect region is calculated based on the estimated probability distribution. In the following description, a set of likelihoods of all the pixels in the defect image is denoted as L and a likelihood of each pixel is denoted as Li. The likelihood initial value setting means 1101 sets a likelihood for each pixels in an image which has not been restored (that is, an image input into the image input means 801) only once. The likelihood initial value setting means 1101 sets the pixel i in the defect region at Li=0 and the pixel j in the non-defect region at Lj=1, for example.

The likelihood storage means 1102 stores a likelihood of each pixel. Specifically, the likelihood storage means 1102 stores a likelihood set by the likelihood calculating means 1101. Alternatively, when the likelihood update means 1103 which is mentioned later updates a likelihood, the likelihood storage means 1102 overwrites and stores the updated likelihood of the pixel on the existing likelihood. The likelihood storage means 1102 is realized by a magnetic disc device provided in the computer $800a$, for example.

The patch selection means $806a$ selects a pair of defect patch and reference patch which is suitable for restoration. Specifically, the patch selection means $806a$ selects a pair of defect patch and reference patch ($\psi p0$, $\psi q0$), which is suitable for restoration, based on the information indicating the defect image and the defect region stored in the frame memory 804, the estimation value of the pixel in the defect region estimated by the defect pixel value estimation means 805, and the likelihoods of the defect image stored in the likelihood storage means 1102. That is, the patch selection means $806a$ selects a pair of defect patch and reference patch used for restoration by use of the patch selection function similarly as the patch selection means 806 according to the first exemplary embodiment. Further, the patch selection means $806a$ according to the present exemplary embodiment selects a pair of patches by use of the likelihoods stored in the likelihood storage means 1102.

There will be described below a case in which a patch selection function $E1(\psi p, \psi q)$ is used for the method for selecting a pair of patches. In the following description, similarly as in the first exemplary embodiment, the defect patch candidate $\psi p$ and the reference patch candidate $\psi q$ are assumed to express a set of pixels in a small region including the pixels p and q in a defect image. For example, the patch selection means $806a$ divides an image including a defect region at equal intervals to determine whether a defect region is included in each region, and classifies a region including a defect region and a region not including a defect region as the defect patch candidate $\psi p$ and the reference patch candidate $\psi q$, respectively.

The patch selection function $E1(\psi p, \psi q)$ is directed for determining in which defect patch $\psi p$ to restore a defect region, and for determining with which reference patch $\psi q$ to restore a defect region, similarly as the patch selection function $E(\omega p, \psi q)$ in the first exemplary embodiment. The patch selection function $E1(\psi p, \psi q)$ takes a smaller value as a pair of patches is more suitable for restoration. At this time, the patch selection means $806a$ calculates the patch selection function $E1(\psi p, \psi q)$ and selects a pair ($\psi p0$, $\psi q0$) having the smallest value of the patch selection function E1. The patch selection function $E1(\psi p, \psi q)$ is configured of the function $A(\psi p)$ and the function $B(\psi p, \psi q)$ defined by the patch selection means 806 in the first exemplary embodiment, and the likelihood stored in the likelihood storage means 1102.

Herein, a likelihood is denoted as Li when the pixels included in the defect patch candidate $\psi p$ are assumed as the pixel i, and a likelihood is denoted as Lj when the pixels included in the reference patch candidate $\psi q$ are assumed as the pixel j. At this time, the patch selection means $806a$ configures the patch selection function E1 as the patch selection function $E1(\psi p, \psi q)$ of Li, Lj, $A(\psi p)$ and $B(\psi p, \psi q)$. Specifically, the patch selection means $806a$ may configure a function such that a value of the patch selection function E1 is smaller as the values of the likelihood Li and the likelihood Lj are larger.

There has been described above the case in which the patch selection means $806a$ uses the likelihoods Li and Lj to configure the function $E1(\omega p, \psi q)$. In addition, the patch selection means $806a$ may apply a function for calculating an arithmetic average or geometric mean of the likelihoods of the pixels included in the defect patch candidate $\psi p$ instead of the likelihood Li to the function $E1(\psi p, \psi q)$. Similarly, the patch selection means $806a$ may apply a function for calculating an arithmetic average or geometric mean of the likelihoods of the pixels included in the reference patch candidate $\psi q$ instead of Lj to the function $E1(\psi p, \psi q)$.

In this way, the patch selection means $806a$ selects, from among the pairs of patches, a pair of patches in which the image of the defect patch and the image of the reference patch are most similar to each other, the pair of patches being made of the defect patch having the highest likelihood in the defect patches and the reference patch having the highest likelihood in the reference patches. Thus, it is possible to prevent a defect patch or reference patch having a non-probable pixel from being selected.

The likelihood update means 1103 calculates likelihoods of the defect pixels in the defect patch and updates a likelihood of each pixel stored in the likelihood storage means 1102. For example, the likelihood update means 1103 uses a value of the patch selection function $E1(\psi p0, \omega q0)$ calculated by the patch selection means 806a, the number of pixels in the defect region included in the defect patch $\psi p0$, the likelihoods of the pixels included in the defect patch $\psi p0$, and the like to calculate the likelihoods of the defect pixels in the defect patch to be updated.

The likelihood update means 1103 may use a weighted average of, for example, a value of the patch selection function $E1(\psi p0, \psi q0)$ calculated based on the selected defect patch $\psi p0$ and reference patch $\psi q0$, a rate of the defect region included in the defect patch $\psi p0$, and an average value of the likelihoods of the pixels in the non-defect region included in the defect patch $\psi p0$ to calculate the likelihoods of the defect pixels.

That is, a pair of patches is selected, which is less likely to collapse the restored image as the value of the patch selection function $E1(\psi p, \psi q)$ is smaller. In this case, the likelihood update means 1103 calculates a higher likelihood. As the rate of the defect region included in the defect patch $\psi p0$ is smaller, a region to be compared by an estimation value is smaller, and thus a pair of patches is selected, which is less likely to collapse the restored image. In this case, the likelihood update means 1103 calculates a higher likelihood. As the average value of the likelihoods of the pixels in the non-defect region included in the defect patch $\psi p0$ is higher, a defect patch including the probable pixels is targeted. Also in this case, the likelihood update means 1103 calculates a higher likelihood. From the above, when a patch is to be selected, the pixels having the lowest likelihood are desired to select later.

The defect region extraction means 803, the defect pixel value estimation means 805, the patch selection means 806a, the image restoration means 807, the likelihood initial value setting means 1101 and the likelihood update means 1103 are realized by the CPU in the computer operating according to the program (image restoration program). The defect region extraction means 803, the defect pixel value estimation means 805, the patch selection means 806a, the image restoration means 807, the likelihood initial value setting means 1101 and the likelihood update means 1103 may be realized in dedicated hardware, respectively.

Figure 8:
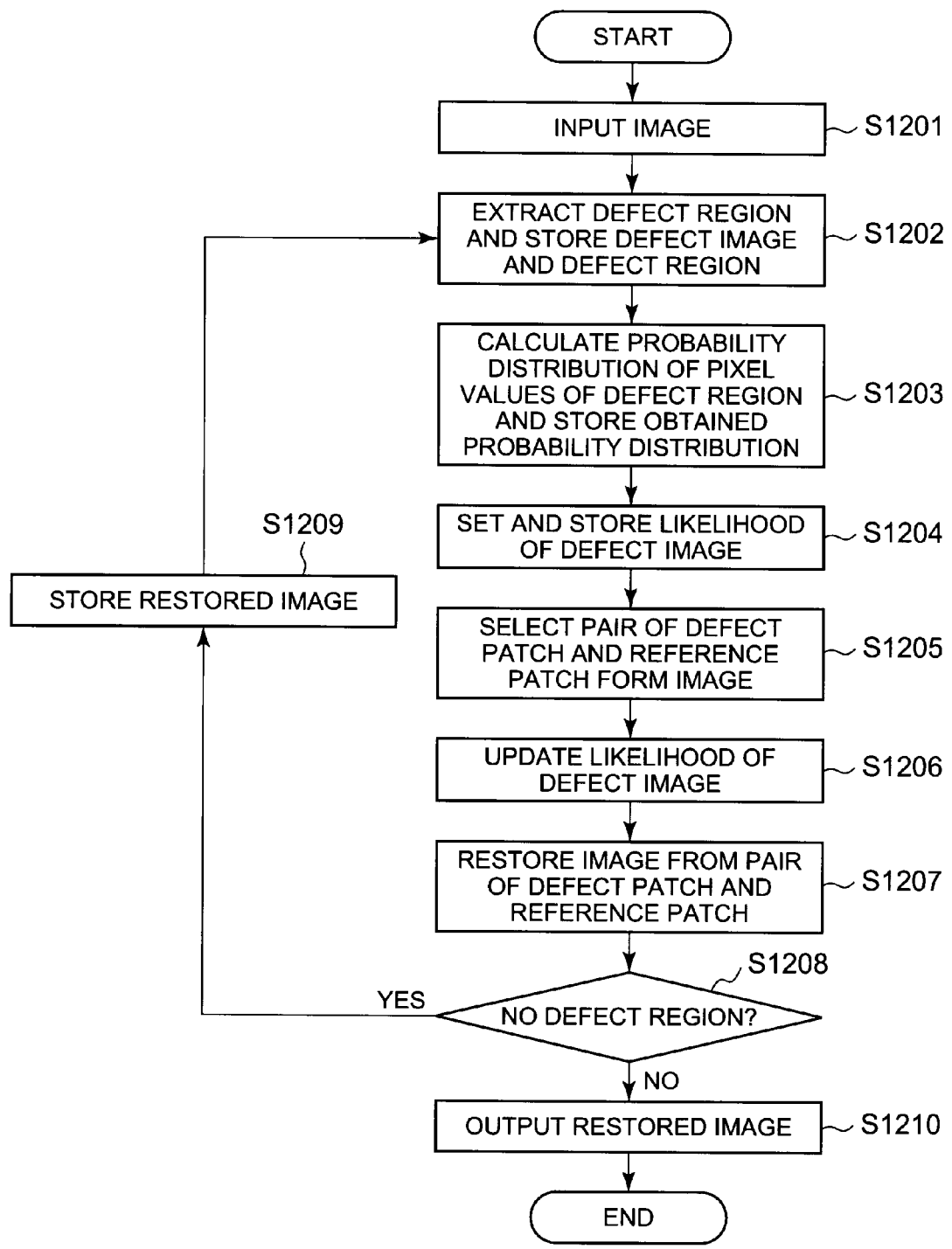
FIG. 8 It depicts a flowchart showing exemplary operations of the image restoration system according to the second exemplary embodiment.

The operations will be described below. FIG. 8 is a flowchart showing exemplary operations of the image restoration system according to the present exemplary embodiment.

At first, a reference image (defect image) is input into the image input means 801 (step S1201). Then, the defect region extraction means 803 extracts a defect region from the defect image input into the image input means 801 and stores the defect image and the defect region in the frame memory 804 (step S1202). The defect pixel value estimation means 805 estimates a pixel value of the pixels in the defect region based on the information indicating the defect image and the defect region stored in the frame memory 804 and stores it in the memory (not shown) (step S1203).

The likelihood initial value setting means 1101 sets a likelihood of each pixel in the defect image and stores the likelihood in the likelihood storage means 1102 (step S1204). The patch selection means 806a uses a patch selection function to select a pair of defect patch and reference patch based on the likelihoods stored in the likelihood storage means 1102 in addition to the information indicating the defect image and the defect region stored in the frame memory 804 and the estimation value of the pixel value estimated by the defect pixel value estimation means 805 (step S1205). Specifically, the patch selection means 806a selects a pair of defect patch and reference patch in which the patch selection function is the smallest, based on the pixel value of the defect region estimated by the defect pixel value estimation means 805, the pixel value of the corresponding reference patch, and the likelihood of the defect image. In this case, the patch selection means 806a selects a pair of defect patch and reference patch including the probable pixels, based on the likelihoods. The likelihood update means 1103 uses the selected pair of patches to update the likelihoods of the pixels of the defect region in the defect patch (step S1206).

The image restoration means 807 uses the pixel value of the pixels in the reference patch to restore the pixel value of the pixels belonging to the defect region in the selected defect patch, based on the pair of defect patch and reference patch selected by the patch selection means 806a and the defect image stored in the frame memory 804, and stores the value in the memory (not shown) (step S1207). The image restoration means 807 determines whether a defect region disappears from the restored image (step S1208). When a defect region is present in other than the restored defect region (No in step S1208), the image restoration means 807 stores the restored image in the image storage means (not shown) (step S1209). Then, the image restoration means 807 notifies the defect region extraction means 803 of the restored image. Subsequently, the defect region extraction means 803, the defect pixel value estimation means 805, the patch selection means 806a, the image restoration means 807, the likelihood initial value setting means 1101 and the likelihood update means 1103 repeat the processings in step S1202 and subsequent steps.

On the other hand, when a defect region is not present in other than the restored defect region (Yes in step S1208), the image restoration means 807 outputs the restored image to the restored image output means 802 (step S1210). For example, the image restoration means 807 displays the recovered restored image on the display device.

The effects of the present exemplary embodiment will be described below. As described above, according to the present exemplary embodiment, in addition to the structure of the first exemplary embodiment, the patch selection means 806a selects, form among the pairs of patches including a defect patch and a reference patch, a pair of patches in which the image of the defect patch and the image of the reference patch are most similar to each other, the pair of patches being made of the defect patch having the highest likelihood in the defect patches and the reference patch having the highest likelihood in the reference patches. Thus, it is possible to prevent a defect patch or reference patch including a non-probable pixel from being selected.

The likelihood update means 1103 calculates a likelihood by the method in which a higher likelihood is calculated as the images selected as a pair of defect patch and reference patch are more similar to each other, and uses the calculated likelihood to update a preset likelihood of each pixel in the image according to the defect region in the input image. The patch selection means 806a selects a pair of patches made of a defect patch having the highest updated likelihood in the defect patches and a reference patch having the highest likelihood in the reference patches. In this way, the most suitable likelihoods are used thereby to restore the image meeting a user's intention.

That is, according to the present exemplary embodiment, the patch selection means 806a selects a patch based on a likelihood of a pixel value of each pixel in a defect image obtained by the likelihood initial value setting means 1101 and the likelihood update means 1103. Thus, it is possible to prevent a pair of defect patch and reference patch having the smallest likelihood of the pixel value of the pixel restored by the image restoration, that is, including the pixels whose pixel value is not probable.

Third Exemplary Embodiment

Figure 9:
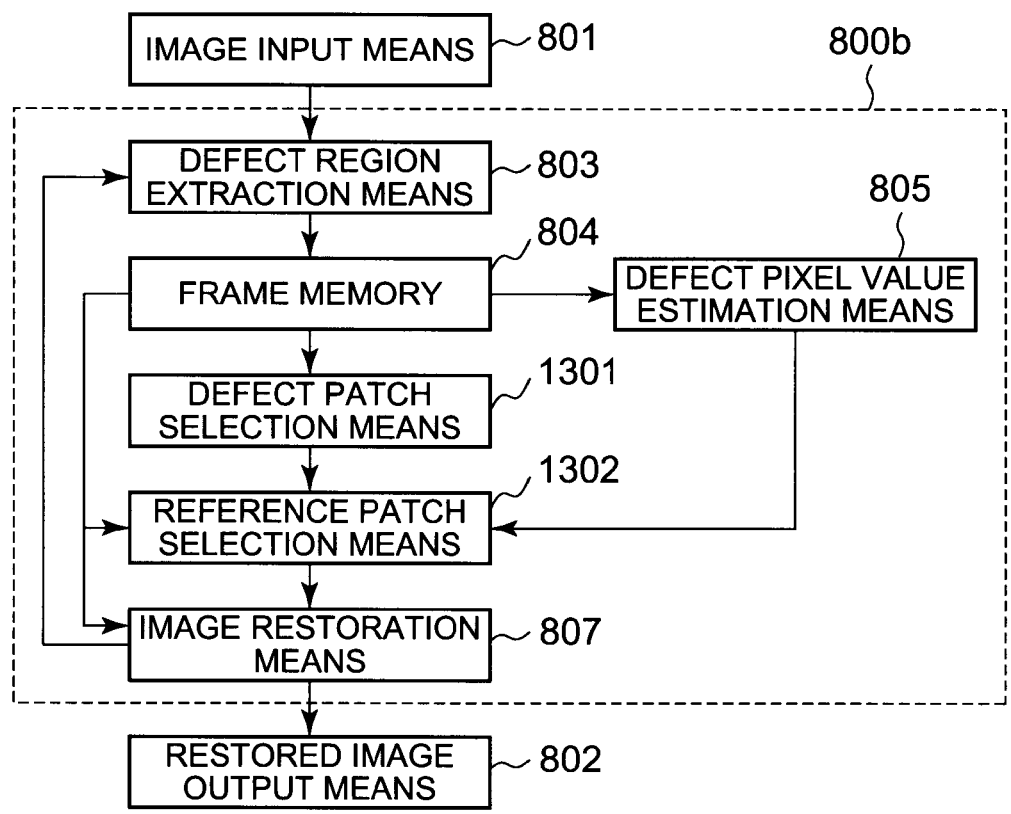
FIG. 9 It depicts a block diagram showing an exemplary image restoration system according to a third exemplary embodiment of the present invention.

FIG. 9 is a block diagram showing an exemplary image restoration system according to a third exemplary embodiment of the present invention. The same constituents as those in the first exemplary embodiment are denoted with the same reference numerals as those in FIG. 1, and a detailed explanation thereof will be omitted. The image processing system according to the third exemplary embodiment includes a computer 800b, an image input means 801 and a restored image output means 802. The image input means 801 and the restored image output means 802 are the same as those in the first exemplary embodiment and thus an explanation thereof will be omitted.

The computer 800b includes a defect region extraction means 803, a frame memory 804, a defect pixel value estimation means 805, an image restoration means 807, a defect patch selection means 1301 and a reference patch selection means 1302. The defect region extraction means 803, the frame memory 804, the defect pixel value estimation means 805 and the image restoration means 807 are the same as those in the first exemplary embodiment.

The defect patch selection means 1301 selects a defect patch suitable for restoration. For example, the defect patch selection means 1301 selects a defect patch based on the information indicating the defect image and the defect region stored in the frame memory 804, and the estimation value of the pixels in the defect region estimated by the defect pixel value estimation means 805, and stores it in the memory (not shown). There will be described below a case in which a defect patch selection function e1($\psi$p) is used for the method for selecting a defect patch. The defect patch selection function e1($\psi$p) defined in the present exemplary embodiment takes a smaller value as a defect patch is more suitable for restoration. At this time, the defect patch selection means 1301 selects a defect patch having the smallest value of the defect patch selection function e1($\psi$p).

The defect patch selection function e1($\psi$p) may employ the function A($\psi$p) in the first exemplary embodiment, for example. The function A($\psi$p) is directed for selecting a candidate which is less likely to collapse the restored image, and thus a defect patch selected by the function A($\psi$p) may be more suitable for restoration. A defect patch selected by the defect patch selection means 1301 is assumed as $\psi$p0 below.

The reference patch selection means 1302 selects a reference patch $\psi$q to be utilized for restoration, based on the defect patch $\psi$p0 selected by the defect patch selection means 1301. There will be described below a case in which a reference patch selection function e2($\psi$p, $\psi$q) is used for the method for selecting a reference patch. The reference patch selection function e2($\psi$p, $\psi$q) takes a smaller value as the reference patch is more suitable for restoration. At this time, the reference patch selection means 1302 selects a reference patch having the smallest value of the reference patch selection function e2($\psi$p, $\psi$q).

The reference patch selection function e2($\psi$p, $\psi$q) may employ the function B($\psi$p0, $\psi$q0) in the first exemplary embodiment, for example. The function B ($\psi$p, $\psi$q) is directed for selecting the most similar patch, and thus a reference patch selected by the function B($\psi$p, $\psi$q) may be the most suitable for restoration.

In this way, in the present exemplary embodiment, the defect patch selection means 1301 selects a defect patch to be restored based on the estimated pixel value, the defect image and the defect region. The reference patch selection means 1302 selects a reference patch to be utilized for restoration, based on the estimated pixel value, the defect image, and the defect region, and the defect patch.

The defect region extraction means 803, the defect pixel value estimation means 805, the defect patch selection means 1301, the reference patch selection means 1302 and the image restoration means 807 are realized by the CPU in the computer operating according to the program (image restoration program). The defect region extraction means 803, the defect pixel value estimation means 805, the defect patch selection means 1301, the reference patch selection means 1302 and the image restoration means 807 may be realized in dedicated hardware, respectively.

Figure 10:
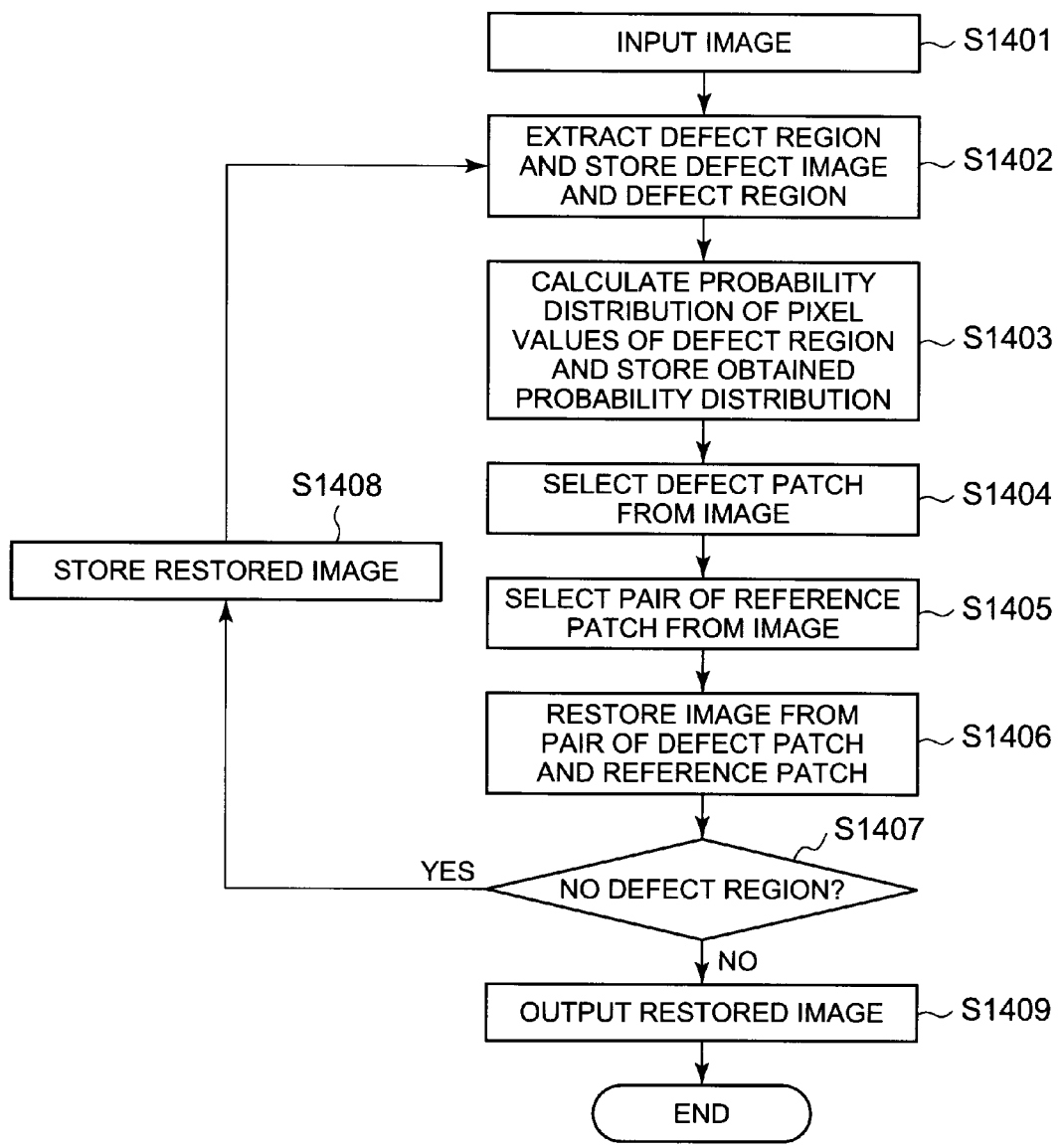
FIG. 10 It depicts a flowchart showing exemplary operations of the image restoration system according to the third exemplary embodiment.

The operations will be described below. FIG. 10 is a flowchart showing exemplary operations of the image restoration system according to the present exemplary embodiment.

At first, a reference image (defect image) is input into the image input means 801 (step S1401). Then, the defect region extraction means 803 extracts a defect region from the defect image input into the image input means 801, and stores the defect image and the defect region in the frame memory 804 (step S1402). The defect pixel value estimation means 805 estimates a pixel value of pixels in the defect region based on the information indicating the defect image and the defect region stored in the frame memory 804, and stores it in the memory (not shown) (step S1403).

The defect patch selection means 1301 uses the defect patch selection function to select a defect patch based on the information indicating the defect image and the defect region stored in the frame memory 804 (step S1404). The reference patch selection means 1302 uses the reference patch selection function to select a reference patch based on the information indicating the defect image and the defect region stored in the frame memory 804, the estimation value of the pixel value estimated by the defect pixel value estimation means 805 and the defect patch selected by the defect patch selection means 1301 (step S1405). The reference patch selection means 1302 may store the selected defect patch and reference patch in the memory (not shown).

The image restoration means 807 uses the pixel value of the pixels in the reference patch to restore the pixel value of the pixels belonging to the defect region in the selected defect patch based on the selected pair of defect patch and reference patch and the defect image stored in the frame memory 804, and stores the value in the memory (not shown) (step S1406). The image restoration means 807 determines whether a defect region disappears from the restored image (step S1407). When a defect region is present in other than the restored defect region (No in step S1407), the image restoration means 807 stores the restored image in the image storage means (not shown) (step S1408). Then, the image restoration means 807 notifies the defect region extraction means 803 of the restored image. Subsequently, the defect region extraction means 803, the defect pixel value estimation means 805, the defect patch selection mean 1301, the reference patch selection mean 1302 and the image restoration means 807 repeat the processings in step S1402 and subsequent steps.

On the other hand, when a defect region is not present in other than the restored defect region (Yes in step S1407), the image restoration means 807 outputs the restored image to the restored image output means 802 (step S1409). For example, the image restoration means 807 displays the recovered restored image on the display device.

The effects of the present exemplary embodiment will be described below. As described above, according to the present exemplary embodiment, the defect patch selection means 1301 selects a defect patch based on the structure information of the defect patch candidates. Then, the reference patch selection means 1302 compares a pixel value of the defect region estimated in the selected defect patch with a pixel value of the corresponding reference patch thereby to select a reference patch which is the most similar to the defect patch from among the reference patches. Thus, the number of calculations of the patch selection function can be reduced during the patch selection, and thus a calculation load necessary for the image restoration can be reduced. That is, when M reference patches and N defect patches are present and when MN pairs of reference patch and defect patch are present, MN trials are needed for calculating all the pairs of reference patch and defect patch. However, according to the present exemplary embodiment, a total of M+N trials including N trials for selecting a defect patch and M trials for selecting a reference patch are conducted thereby to select a pair of defect patch and reference patch.

Fourth Exemplary Embodiment

Figure 11:
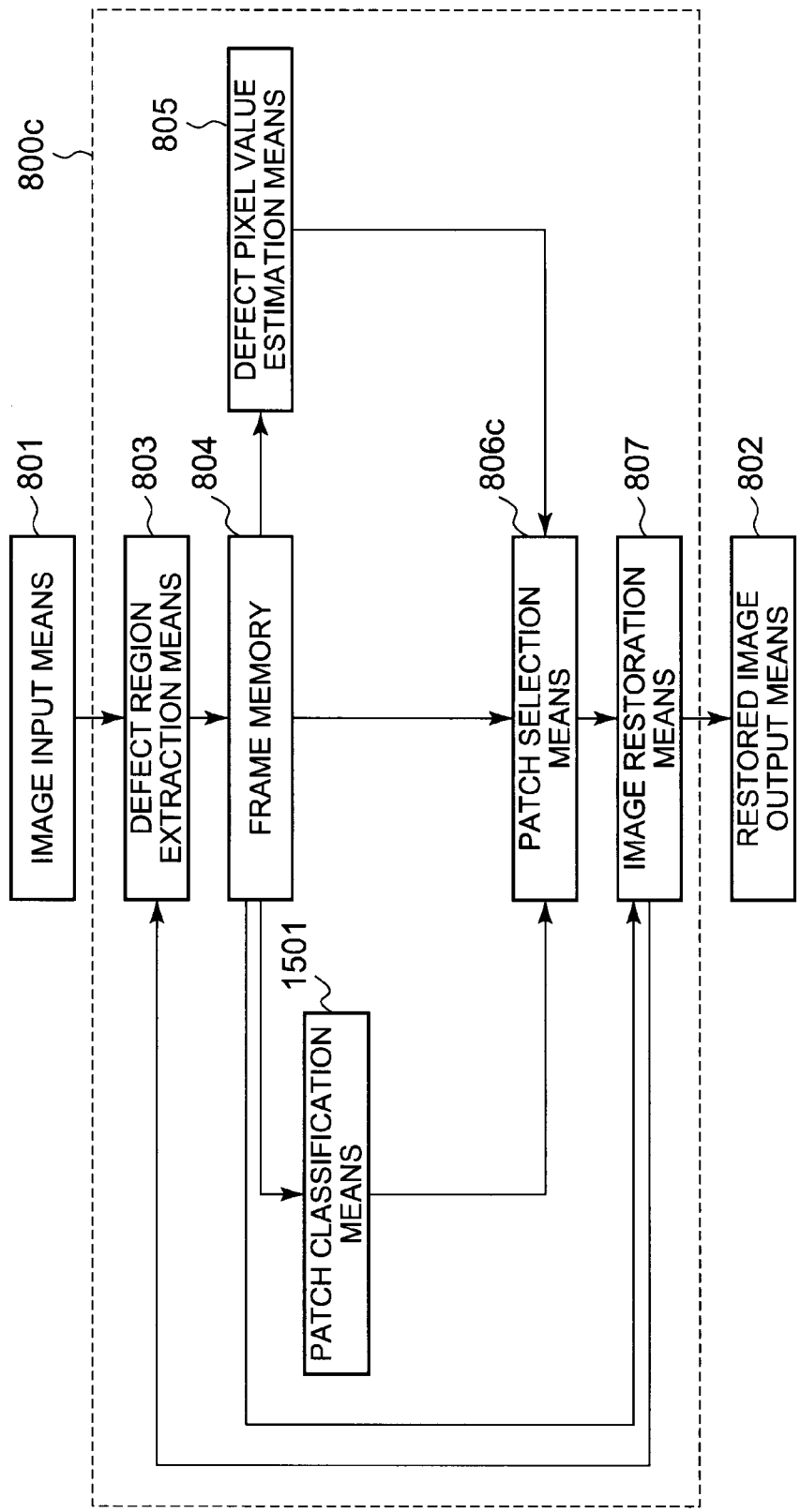
FIG. 11 It depicts a block diagram showing an exemplary image restoration system according to a fourth exemplary embodiment of the present invention.

FIG. 11 is a block diagram showing an exemplary image restoration system according to a fourth exemplary embodiment of the present invention. The same constituents as those in the first exemplary embodiment are denoted with the same reference numerals as those in FIG. 1 and a detailed explanation thereof will be omitted. The image processing system according to the fourth exemplary embodiment includes a computer 800c, an image input means 801 and a restored image output means 802. The image input means 801 and the restored image output means 802 are the same as those in the first exemplary embodiment and thus an explanation thereof will be omitted.

The computer 800c includes a defect region extraction means 803, a frame memory 804, a defect pixel value estimation means 805, a patch selection means 806c, the image restoration means 807, and a patch classification means 1501. The defect region extraction means 803, the frame memory 804, the defect pixel value estimation means 805 and the image restoration means 807 are the same as those in the first exemplary embodiment.

The patch classification means 1501 uses the information indicating the defect image and the defect region stored in the frame memory 804 to previously classify and label the reference patch candidates and the defect patch candidates. The patch classification means 1501 may calculate an average or dispersion of the pixel values of the pixels in each patch, and a histogram, for example, for clustering and labeling, as a labeling method. Alternatively, the patch classification means 1501 may specify an object captured in each patch by use of the object recognition technique and may conduct labeling based on the specified object. The patch classification means 1501 stores a label of the classified patch in the memory (not shown).

There will be specifically described that the patch classification means 1501 classifies the reference patch candidates and the defect patch candidates for labeling. At first, the patch classification means 1501 classifies the regions in an image into the defect patch candidates ψp and the reference patch candidates ψq. With the classification method, as described in the first exemplary embodiment, the image including the defect region is divided at equal intervals and a determination is made as to whether a defect region is included in each region, for classification. Then, the patch classification means 1501 clusters the candidates based on a common property such as the regions on the border, the regions in the background color and the regions of the object, for labeling per class. At this time, the patch classification means 1501 performs clustering by K-means. The clustering method is not limited to the K-means. In this way, the patch classification means 1501 clusters the patch candidates (ψp and ψq) classified into the defect patch and the reference patch within the candidates of the defect patch and reference patch based on the common property.

The patch selection means 806c selects a pair of defect patch and reference patch based on the labels classified by the patch classification means 1501, the information indicating the defect image and the defect region stored in the frame memory 804, and the estimation value of the pixel value of the defect region estimated by the defect pixel value estimation means 805. There will be described a case in which the present exemplary embodiment uses the patch selection function E(ψp, ψq) for such a method for selecting a pair of patches similarly as in the first exemplary embodiment. That is, the patch selection means 806c selects a pair of patches by finding the minimum value of E(ψp, ψq). In the present exemplary embodiment, the patch selection means 806c selects a pair of patches in which the label of the defect patch candidate ψp is the same as the label of the reference patch candidate ψq. Specifically, the patch selection means 806c selects a pair of patches (ψp0, ψq0) by calculating the patch selection function of only the pair in which the label of the defect patch candidate ψp is the same as the label of the reference patch candidate ψq. Then, the patch selection means 806c stores the selected pair (ψp0, ψq0) of defect patch and reference patch in the memory (not shown).

In the first exemplary embodiment, the patch selection means 806 calculates the patch selection function for a total of MN pairs of patch candidates and selects a pair of patches (ψp0, ψq0). On the other hand, in the present exemplary embodiment, the patch selection means 806c calculates the patch selection function of only the pairs of patches in which the label of the defect patch candidate ψp is the same as the label of the reference patch candidate ψq, and selects a pair of patches (ψp0, ψq0). Thus, a calculation load necessary for the image restoration can be reduced. In other words, the patch classification means 1501 previously classifies the patches into the defect patches to be restored and the reference patches used for restoration and thus the image restoration means 807 can rapidly select a defect patch and a reference patch.

The defect region extraction means 803, the defect pixel value estimation means 805, the patch selection means 806c, the image restoration means 807 and the patch classification means 1501 are realized by the CPU in the computer operating according to the program (image restoration program). The defect region extraction means 803, the defect pixel value estimation means 805, the patch selection means 806c, the image restoration means 807 and the patch classification means 1501 may be realized in dedicated hardware, respectively.

Figure 12:
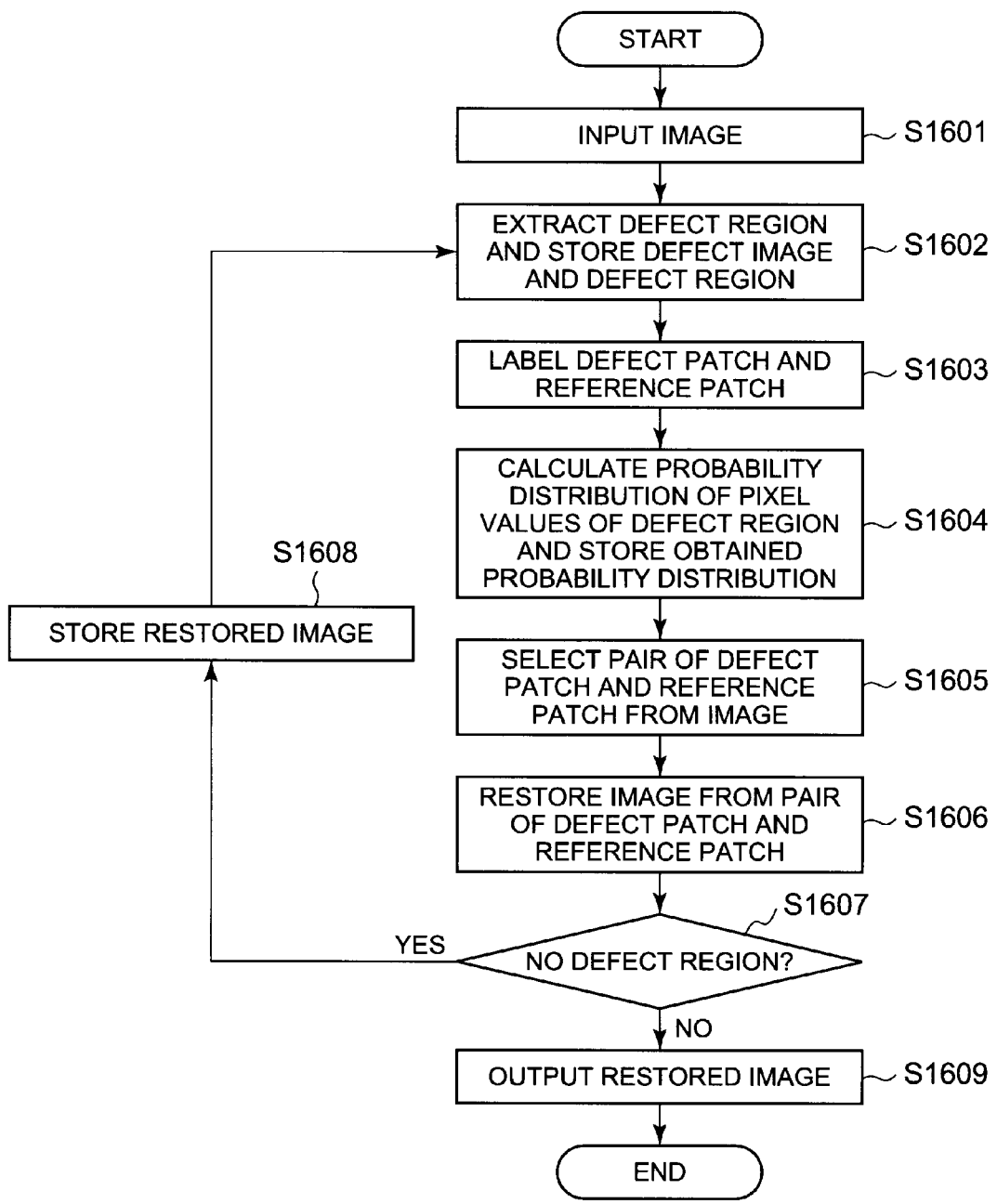
FIG. 12 It depicts a flowchart showing exemplary operations of the image restoration system according to the fourth exemplary embodiment.

The operations will be described below. FIG. 12 is a flowchart showing exemplary operations of the image restoration system according to the present exemplary embodiment.

At first, a reference image (defect image) is input into the image input means 801 (step S1601). Then, the defect region extraction means 803 extracts a defect region from the defect image input into the image input means 801 and stores the defect image and the defect region in the frame memory 804 (step S1602). The patch classification means 1501 uses the information indicating the defect image and defect region stored in the frame memory 804 to classify and label the reference patch candidates and the defect patch candidates (step S1603). The patch classification means 1501 may store the labeled information in the memory (not shown).

Then, the defect pixel value estimation means 805 estimates a pixel value of the pixels in the defect region based on the information indicating the defect image and the defect region stored in the frame memory 804, and stores it in the memory (not shown) (step S1604). The patch selection means 806c selects a pair of defect patch and reference patch based on the labels classified by the patch classification means 1501, the information indicating the defect image and the defect region stored in the frame memory 804, and the estimation value of the pixel value of the defect region estimated by the defect pixel value estimation means 805 (step S1605). The patch selection means 806c may store the selected pair of patches in the memory (not shown).

The image restoration means 807 uses the pixel value of the pixels in the reference patch to restore the pixel value of the pixels belonging to the defect region in the selected defect patch, based on the pair of defect patch and reference patch selected by the patch selection means 806c and the defect image stored in the frame memory 804, and stores the value in the memory (not shown) (step S1606). The image restoration means 807 determines whether a defect region disappears from the restored image (step S1607). When a defect region is present in other than the restored defect region (No in step S1607), the image restoration means 807 stores the restored image in the image storage means (not shown) (step S1608). Then, the image restoration means 807 notifies the defect region extraction means 803 of the restored image. Subsequently, the defect region extraction means 803, the defect pixel value estimation means 805, the patch selection means 806c, the image restoration means 807 and the patch classification means 1501 repeat the processings in step S1602 and subsequent steps.

On the other hand, when a defect region is not present in other than the restored defect region (Yes in step S1607), the image restoration means 807 outputs the restored image to the restored image output means 802 (step S1609). For example, the image restoration means 807 displays the recovered restored image on the display device.

The effects of the present exemplary embodiment will be described below. As described above, according to the present exemplary embodiment, the patch classification means 1501 clusters the patch candidates classified as a defect patch and a reference patch based on the common property, and the patch selection means 806c selects a defect patch and a reference patch classified into the same class as a pair of patches. That is, the patch classification means 1501 previously classifies the defect patch candidates and the reference patch candidates for labeling. Thereafter, the patch selection means 806c determines a pair of defect patch and reference patch. Thus, during patch selection, the number of calculations using the patch selection function can be reduced as compared with the method not classifying the patches, and thereby a calculation load necessary for the image restoration can be reduced.

Fifth Exemplary Embodiment

Figure 13:
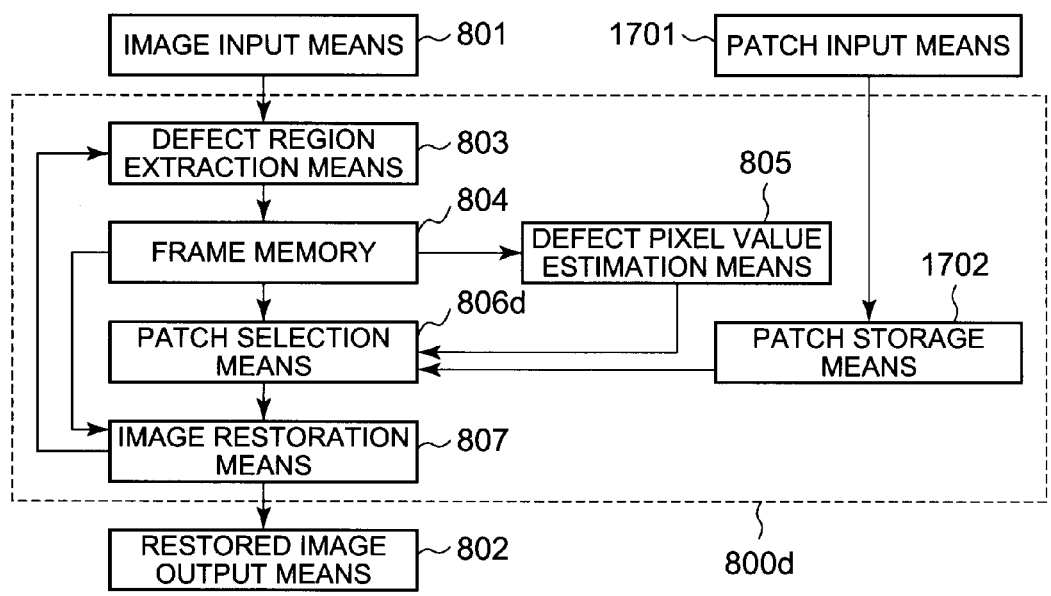
FIG. 13 It depicts a block diagram showing an exemplary image restoration system according to a fifth exemplary embodiment of the present invention.

FIG. 13 is a block diagram showing an exemplary image restoration system according to a fifth exemplary embodiment of the present invention. The same constituents as those in the first exemplary embodiment are denoted with the same reference numerals as those in FIG. 1 and a detailed explanation thereof will be omitted. The image processing system according to the fifth exemplary embodiment includes a computer 800d, an image input means 801, a restored image output means 802 and a patch input means 1701. The image input means 801 and the restored image output means 802 are the same as those in the first exemplary embodiment and thus an explanation thereof will be omitted.

The patch input means 1701 is input with patch candidates to be referred for restoring a defect region in a defect image in addition to the defect image, and stores the patch candidates in a patch storage means 1702 described later. For example, when the images such as persons and landscapes are previously collected in a database, the patch input means 1701 may store a patch generated from the image as a patch candidate in the patch storage means 1702. Alternatively, when the input image corresponds to one frame in the images configured in time sequence, the patch input means 1701 may store the patches generated from the images in time sequence as the patch candidates in the patch storage means 1702.

The computer 800d includes a defect region extraction means 803, a frame memory 804, a defect pixel value estimation means 805, a patch selection means 806d, an image restoration means 807 and a patch storage means 1702. The defect region extraction means 803, the frame memory 804, the defect pixel value estimation means 805 and the image restoration means 807 are the same as those in the first exemplary embodiment.

The patch storage means 1702 stores the patch candidates input by the patch input means 1701 therein. The patch storage means 1702 is realized by a magnetic disc device provided in the computer 800d, for example. When the patch storage means 1702 previously stores the patch candidates therein, the image restoration system may not include the patch input means 1701.

The patch selection means 806d selects a pair of defect patch and reference patch based on the patch candidates stored in the patch storage means 1702 in addition to the information indicating the defect image and the defect region stored in the frame memory 804 and the estimation value of the pixel value estimated by the defect pixel value estimation means 805. The patch selection means 806d may select a pair of patches by adding a patch candidate to a reference patch to be selected from the defect image. The method for selecting a pair of patches may use the patch selection function similarly as in the first exemplary embodiment. In the first exemplary embodiment, the patch selection means 806 selects only a reference patch selected from the image input into the image input means 801 as a patch to be restored. In the present exemplary embodiment, the patch selection means 806d selects a patch candidate stored in the patch storage means 1702 as a patch to be restored, in addition to a reference patch selected from the image input into the image input means 801. Thus, even when a reference patch capable of restoring the image without collapse is not present in the input image, a reference patch can be selected from the patch candidates stored in the patch storage means 1702. Therefore, it is possible to select a reference patch more suitable for restoration.

The defect region extraction means 803, the defect pixel value estimation means 805, the patch selection means 806d and the image restoration means 807 are realized by the CPU in the computer operating according to the program (image restoration program). The defect region extraction means 803, the defect pixel value estimation means 805, the patch selection means 806d and the image restoration means 807 may be realized in dedicated hardware, respectively.

Figure 14:
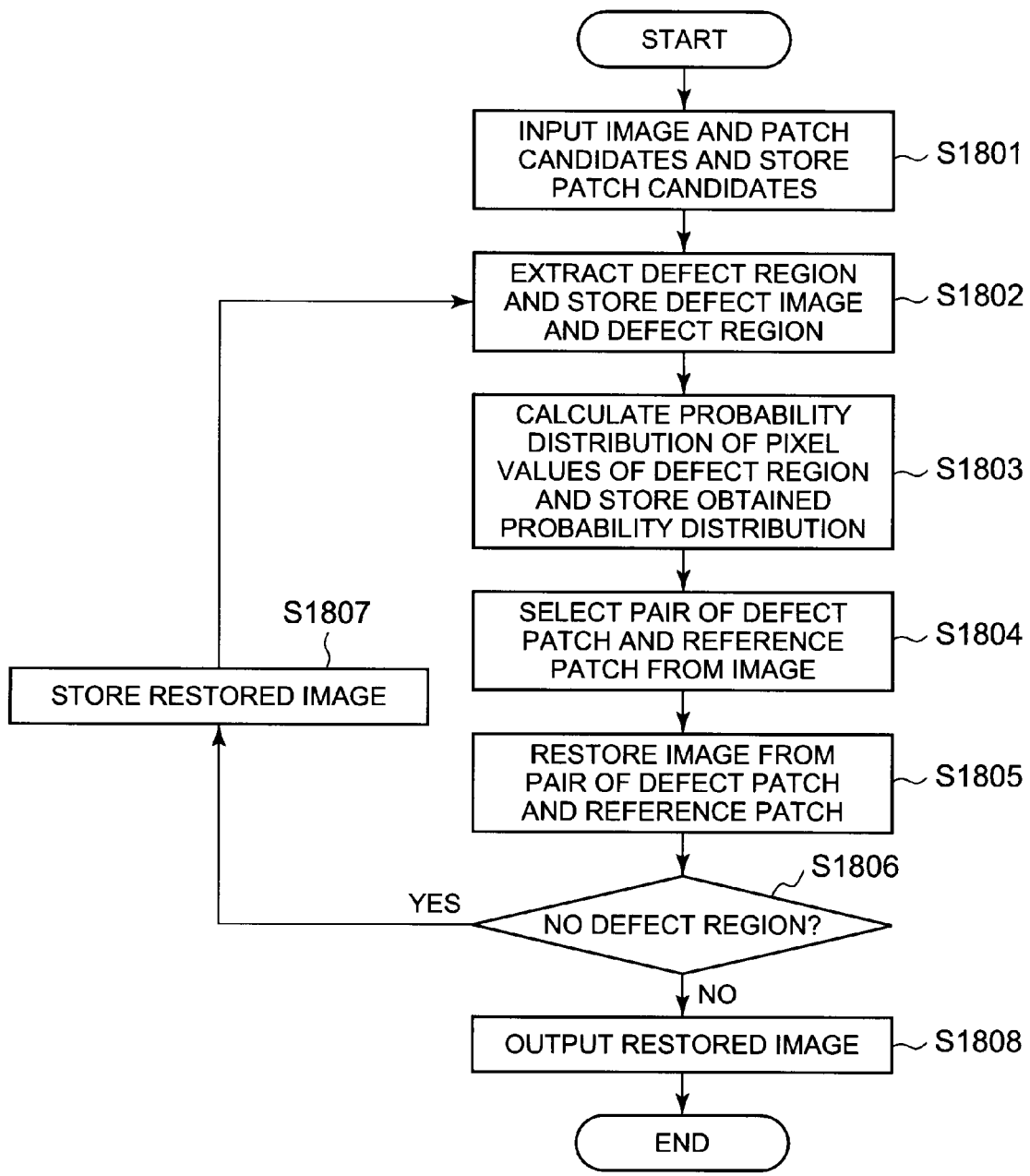
FIG. 14 It depicts a flowchart showing exemplary operations of the image restoration system according to the fifth exemplary embodiment.

The operations will be described below. FIG. 14 is a flowchart showing exemplary operations of the image restoration system according to the present exemplary embodiment.

At first, a reference image (defect image) is input into the image input means 801. The patch input means 1701 stores input patch candidates in the patch storage means 1702 (step S1801). Then, the defect region extraction means 803 extracts a defect region from the defect image input into the image input means 801 and stores the defect image and the defect region in the frame memory 804 (step S1802). The defect pixel value estimation means 805 estimates a pixel value of the pixels in the defect region based on the information indicating the defect image and the defect region stored in the frame memory 804 and stores it in the memory (not shown) (step S1803). Then, the patch selection means 806d selects a pair of defect patch and reference patch by use of the patch selection function based on the information indicating the defect image and the defect region stored in the frame memory 804, the estimation value of the pixel value estimated by the defect pixel value estimation means 805, and the patch candidates stored in the patch storage means 1702 (step S1804).

The image restoration means 807 uses the pixel value of the pixels in the reference patch to restore the pixel value of the pixels belonging to the defect region in the selected defect patch based on the pair of defect patch and reference patch selected by the patch selection means 806d and the defect image stored in the frame memory 804, and stores the value in the memory (not shown) (step S1805). The image restoration means 807 determines whether a defect region disappears from the restored image (step S1806). When a defect region is present in other than the restored defect region (No in step S1806), the image restoration means 807 stores the restored image in the image storage means (not shown) (step S1807). Then, the image restoration means 807 notifies the defect region extraction means 803 of the restored image. Subsequently, the defect region extraction means 803, the defect pixel value estimation means 805, the patch selection means 806d and the image restoration means 807 repeat the processings in step S1802 and subsequent steps.

On the other hand, when a defect region is not present in other than the restored defect region (Yes in step S1806), the image restoration means 807 outputs the restored image to the restored image output means 802 (step S1808). For example, the image restoration means 807 displays the recovered restored image on the display device.

The effects of the present exemplary embodiment will be described below. As described above, according to the present exemplary embodiment, the patch selection means 806d determines a reference patch necessary for restoring the image not only from the image but also by the patch candidates previously input into the patch storage means 1702. Thus, even when a reference patch capable of restoring an image without collapse is not present in the image, the image can be restored.

First Example

The present invention will be described below by way of specific examples but the scope of the present invention is not limited to the following description. The present example corresponds to the second exemplary embodiment. The examples of the present invention will be described below with reference to FIG. 7.

In the present example, it is assumed that a video capture board capable of inputting and outputting a NTSC (National Television System Committee) signal is employed as a device for outputting the processing results to an image input means 801 and a restored image output means 802. Further, it is assumed that a display device is employed as the restored image output means 802. In the present example, it is assumed that an image processing board mounting an image processing processor thereon is employed as a computer 800a. These operate as follows.

At first, the video capture board converts an input video signal into a RGB signal and transmits the RGB signal to the image processing board. When being transferred with a processing result in the image processing board, the video capture board converts the processing result into a video signal and displays it on the display device. In this way, in the present example, the processing result in the image processing board is transferred to the video capture board and the video capture board displays the image on the display device. The image processing board is assumed to have a defect region extraction means 803, a frame memory 804, a defect pixel value estimation means 805, a likelihood calculation means 1101, a likelihood storage means 1102, a likelihood update means 1103, a patch selection means 806a and an image restoration means 807.

When an input signal of a defect image is input into the image input means 801, the defect region extraction means 803 extracts a defect region in the defect image. In the present example, it is assumed that the signal of the defect image is expressed in the RGB form. A vector having the pixel value of the pixel i in the defect image as an element is denoted as $x_i = (R_i, G_i, B_i)^t$. A luminance value of the pixel i is denoted as $I_i$ and a luminance gradient is denoted as $\nabla I_i$. A set of pixels in the defect region is denoted as $\Omega$ and a set of pixels in the non-defect region is denoted as $\xi$.

In the present example, it is assumed that the defect region in the defect image is previously given by the user. Specifically, when the pixels in the defect region in the defect image are assumed as j, a pixel value xj of the pixels j is previously defined as $x_j = (0, 255, 0)^t$ by the user. The defect region extraction means 803 detects the pixels having the pixel value of $(R_i, G_i, B_i)^t = (0, 255, 0)^t$ and thereby extracts the defect region. When a defect region is preset in the image restored by the image restoration means 807, the defect region extraction means 803 extracts a defect region again with the restored image as input image.

The defect image input into the defect region extraction means 803 and the information indicating the extracted defect region are stored in the frame memory 804. When the defect image and the information indicating the defect region is updated, the defect region extraction means 803 overwrites the defect image and the information indicating the defect region which are previously stored. In the present example, the information indicating the defect region is stored in the form of mask image. Specifically, when a value of the pixels i in the mask image is denoted as $Y_i$, the mask image is defined as the following Formula 5 and the value is stored in the frame memory 804.

$$Y_i = 1 \ (i \in \Omega)$$

$$Y_i = 0 \ (i \in \xi) \quad \text{(Formula 5)}$$

The likelihood initial value setting means 1101 sets a likelihood L per pixel based on the defect image and the information indicating the defect region stored in the frame memory 804. The likelihood initial value setting means 1101 sets a likelihood Li at the pixel i as the following Formula 6.

$$Li=0 (i\in\Omega)$$

$$Li=1 (i\in\zeta) \quad \text{(Formula 6)}$$

The likelihood storage means 1102 stores the likelihood set by the likelihood initial value setting means 1101 per pixel. When the likelihood update means 1103 updates the likelihood of the pixel i, the likelihood storage means 1102 overwrites and stores the updated likelihood of the pixel on the existing likelihood.

The defect pixel value estimation means 805 uses the defect image and the information indicating the defect region stored in the frame memory 804 to calculate a probability distribution function of the pixel value of the pixels belonging to the defect region. Therefore, at first, the defect pixel value estimation means 805 radially searches the pixels in the non-defect region in the direction of K pixels for the pixels j in the defect region. The searched pixels are assumed as the pixels k (k=1 . . . K) and a set of pixel values of the pixels is denoted as {xk}. The defect pixel value estimation means 805 approximates the probability distribution function of the pixel values which the pixels j may take by the blend Gaussian distribution indicated in the following Formula 7, based on {xk}.

[Math. 5]

$$p(x_j | \{x_k\}) = \frac{\sum_{k=1}^{K} \exp[-(x_j - x_k)^t \Lambda^{-1}(x_j - x_k)]}{Z} \quad \text{(Formula 7)}$$

wherein ^ is a covariance matrix and is defined by the following Formula 8 using a parameter σ and a unit matrix I of 3×3.

$$\hat{} = \sigma^{-2} I \quad \text{(Formula 8)}$$

Z is a normalization constant of the probability distribution function, and Z is set that the integral value is set at 1 when the probability distribution function expressed in the Formula 7 is integrated by a probability variable xj. σ is a parameter which is preset to be smaller as the content of xk is more reliable.

The defect pixel value estimation means 805 calculates a probability distribution function p (xj|{xk}) per pixel in the defect region as described above, and stores it in the memory (not shown).

The patch selection means 806a selects a defect patch ψp0 and a reference patch ψq0, which are used for restoration, by the likelihood per pixel stored in the likelihood storage means 1102, the defect image and the information indicating the defect region stored in the frame memory 804, and the probability distribution function p(xj|{xk}) of the pixel values of the pixels belonging to the defect region. At this time, the patch selection means 806a finds the minimum value of the patch selection function E1(ψp, ψq) and thereby selects a pair of defect patch ψp0 and reference patch ψq0.

In the following description, a size and shape of the defect patch candidate ψp and the reference patch candidate ψq are assumed as a rectangle having a size of n×m pixels. In the present example, the center pixels of the defect patch candidate ψp and the reference patch candidate ψq are defined as the pixel p and the pixel q, respectively, and the likelihood of the pixel p is assumed as Lp and the likelihood of the pixel q is assumed as Lq. At this time, the patch selection function E1(ψp, ψq) is defined as the following Formula 9.

$$E1(\psi p, \psi q) = A(\psi p) \cdot B(\psi p, \psi q)/(Lp \cdot Lq + \epsilon) \quad \text{(Formula 9)}$$

Herein, ε is a real number larger than 0 and a parameter preset depending on the range of the calculated value of the patch selection function E1. In the present example, it is assumed that a defect region is not present in the reference patch candidate ψq. In the present example, the center pixel of each patch candidate will be mainly described. The selected pixel is not limited to the center of the patch region and may be at an arbitrary position.

The function A(ψp) is defined as the following Formula 10.

$$A(\psi p) = 1/|\nabla Ip \times \nabla Yp| \quad \text{(Formula 10)}$$

Herein, ∇Ip is a luminance gradient value at the pixel p and ∇Yp is a gradient at the pixel p in the mask image. ∇Ip×∇Yp indicates a vector product (outer product) of the vector ∇Ip and the vector ∇Yp. The function B(ψp, ψq) is configured as the following Formula 11 with the three terms of B1(ψp, ψq), B2(ψp, ψq) and B3(ψp, ψq).

[Math. 6]

$$B(\psi p, \psi q) = \beta 1 \cdot B1(\psi p, \psi q) + \beta 2 \cdot B2(\psi p, \omega q) + \beta 3 \cdot B3(\psi p, \psi q) \quad \text{(Formula 11)}$$

where β1, β2, and β3 are the coefficients for adjusting a weight of the value calculated by each function.

The patch selection means 806a defines B1(ψp, ψq) as follows. At first, the patch selection means 806a uses the K-means to cluster the pixel values of the pixels of the image in the non-defect region in the defect image into C pairs, and labels the clustered pixels per class. In the following, the label in each class is denoted as c(c=1 . . . C) and the cluster center is denoted as μ(c). The label of the pixel i is denoted as ci. Then, the patch selection means 806a detects a label included in the defect patch candidate ψp, and assumes a set of pixels labeled to be detected as cp0. The patch selection means 806a uses the following Formula 12 to calculate the amount ϕj for the pixels j meeting the condition that the corresponding pixels in the defect patch candidate ωp are a defect region for the pixels in the reference patch candidate ψq.

[Math. 7]

$$\phi_j = \min_{c \in c_{p0}} [\mu(c_j) - \mu(c)] \quad \text{(Formula 12)}$$

The patch selection means 806a calculates the square sum of the obtained ϕj and assumes it as the function B1 (ψp, ψq) indicated in the following Formula 13.

[Math. 8]

$$B1(\psi_p, \psi_q) = \sum_j \phi_j^2 \quad \text{(Formula 13)}$$

When a different label from the label of the class present in the defect patch candidate ψp is present in the pixels in the reference patch candidate ψq, the function B1(ψp, ψq) takes a larger difference in pixel value. In the function B1(ψp, ψq), the patch selection means 806a calculates the sum of the pixels j meeting the above condition (that is, the condition that "the corresponding pixels in the defect patch candidate ψp are a defect region for the pixels in the reference patch candidate ψq").

Then, when the pixels in the reference patch candidate ψq corresponding to the defect patch candidate ψp are assumed as j, the patch selection means 806a uses the probability distribution function p (xj|{xk}) obtained by the defect pixel value estimation means 805 to define the function B2(ψp, ψq) as the following Formula 14.

[Math. 9]

$$B2(\psi_p, \psi_q) = \sum_j \{-\log(p(x_j | \{x_k\}))\}^2 \quad \text{(Formula 14)}$$

Herein, the function B2(ψp, ψq) expresses how much the estimation value of the pixels in the defect region present in the defect patch candidate ψp is different from the pixel value of the pixels in the corresponding reference patch candidate ψq, and takes a smaller value as the pixel values of both the patch candidates are closer to each other. For the function B2(ψp, ψq), the patch selection means 806a calculates a sum of the pixels j meeting the above condition (that is, the condition that "the corresponding pixels in the defect patch candidate ψp are a defect region for the pixels in the reference patch candidate ψq").

Then, the patch selection means 806a defines the function B3(ψp, ψq) as the square sum of the difference between the pixel value of the pixels in the non-defect region in the defect patch candidate ψp and the pixel value of the pixels in the corresponding reference patch candidate ψq. That is, when the pixels j in the defect patch candidate ψp correspond to the pixels i in the reference patch candidate ψq, the patch selection means 806a defines the function B3(ψp, ψq) as the following Formula 15.

[Math. 10]

$$B3(\psi_p, \psi_q) = \sum_j (x_j - x_i)^2 \quad \text{(Formula 15)}$$

Herein, the function B3(ψp, ψq) indicates how much the pixel value of the pixels in the non-defect region present in the defect patch candidate ψp is different from the pixel value of the pixels in the corresponding reference patch candidate ψq, and takes a smaller value as the pixel values of both the patch candidates are closer to each other. For the function B3(ψp, ψq), the patch selection means 806a calculates a sum of the pixels j meeting the condition that "the pixels belong to the non-defect region."

The patch selection means 806a selects a pair of patches (ψp0, ψq0) having the minimum value of the thus-obtained function E1(ψp, ψq). The patch selection means 806a stores the selected pair of patches (ψp0, ψq0) and the minimum value of the patch selection function E1(ψp0, ψq0) in the memory (not shown).

The likelihood update means 1103 calculates a likelihood by the method in which a likelihood is higher as the images selected as a pair of defect patch and reference patch are more similar to each other (that is, the pixel values of both the patch candidates are closer to each other), and uses the calculated likelihood to update the existing likelihood. Specifically, the likelihood update means 1103 uses the following Formula 16 to calculate the reciprocal $L_j^{-1}$ of the likelihood Lj based on the pair of patches (ψp0, ψq0) selected by the patch selection means 806a, and the minimum value of E1(ψp0, ψq0). The likelihood update means 1103 updates the likelihood Lj of the pixel j belonging to the defect region in the defect patch based on the calculated $L_j^{-1}$.

[Math. 11]

$$L_j^{-1} = \gamma \cdot \left\{ \frac{E(\psi_{p0}, \psi_{q0})}{(\#\psi_{p0})} + \frac{\sum_{j \in (\psi_{p0} \cap G)} L_j^{-1}}{\alpha \cdot (\#(\psi_{p0} \cap \Omega)) + (\#(\psi_{p0} \cap G))} \right\} \quad \text{(Formula 16)}$$

Herein, #ψp0 indicates the number of pixels in the defect patch ψp0. Further, (ψp0∩Ω) indicates the pixels in the defect region in the defect patch ψp0 and #(ψp0∩Ω) indicates the number of pixels in the defect region in the defect patch ψp0. (ψp0Ωξ) indicates the pixels in the non-defect region in the defect patch ψp0 and #(ωp0∩ξ) indicates the number of pixels in the non-defect region in the defect patch ψp0. Then, $\Sigma L_j^{-1}$ indicates a total of reciprocals of the likelihoods of the pixels belonging to the non-defect region in the defect patch ψp0. γ is a parameter indicating at which rate the updated likelihood of the image is increased, and is preset by the user.

The contents of the respective terms exemplified in the Formula 16 are as follows. At first, the first term is defined based on the fact that a pair of patches which is less likely to collapse the restored image can be selected as the average value per pixel in the patch selection function is smaller. The second term is defined based on the fact that a pair of patches which is less likely to collapse the restored image can be selected since the number of pixels in the non-defect region in the defect patch is relatively larger as the number of pixels in the defect region in the defect patch is smaller. The third term is defined based on the fact that the information is present, which is capable of selecting a pair of patches which is less likely to collapse the restored image, as the number of pixels in the non-defect region in the defect patch is larger and that a pair of patches which is less likely to collapse the restored image can be selected as the pixels having higher likelihoods in the non-defect region concentrate.

Each term exemplified in the Formula 16 is defined based on the above reason. Thus, the method for calculating the reciprocal $L_j^{-1}$ of the likelihood Lj is not limited to the contents of the Formula 16. The likelihood Lj may be calculated by an arbitrary combination of terms included in the Formula 16. The likelihood Lj may be calculated by other calculation method indicating the contents of the terms.

The image restoration means 807 replaces the pixel value of the pixels belonging to the defect region in the defect patch ψp0 with the pixel value of the pixels in the corresponding reference patch ψq0 based on the pair of patches (ψp0, ψq0) selected by the patch selection means 806a.

Second Example

Other method by which the defect pixel value estimation means 805 estimates a pixel value in a defect image will be described below. In the following description, there will be described a case in which the defect pixel value estimation means 805 estimates a pixel value in a defect region based on a two-stage processing exemplified below.

The defect pixel value estimation means 805 first estimates an edge structure of a defect region in the first stage, and estimates a pixel value in the defect region based on the edge structure in the second stage. Specifically, the defect pixel value estimation means 805 first estimates the edge structure. Then, a pixel value of the pixels near the edge estimated by the edge structure is estimated, and the defect pixel value estimation means 805 calculates a weighted average between the estimated pixel value and the pixel value in the non-defect region and estimates the pixel value in the defect region. The processings in the first stage will be specifically described below with reference to FIG. 15 and FIG. 16.

Figure 15:
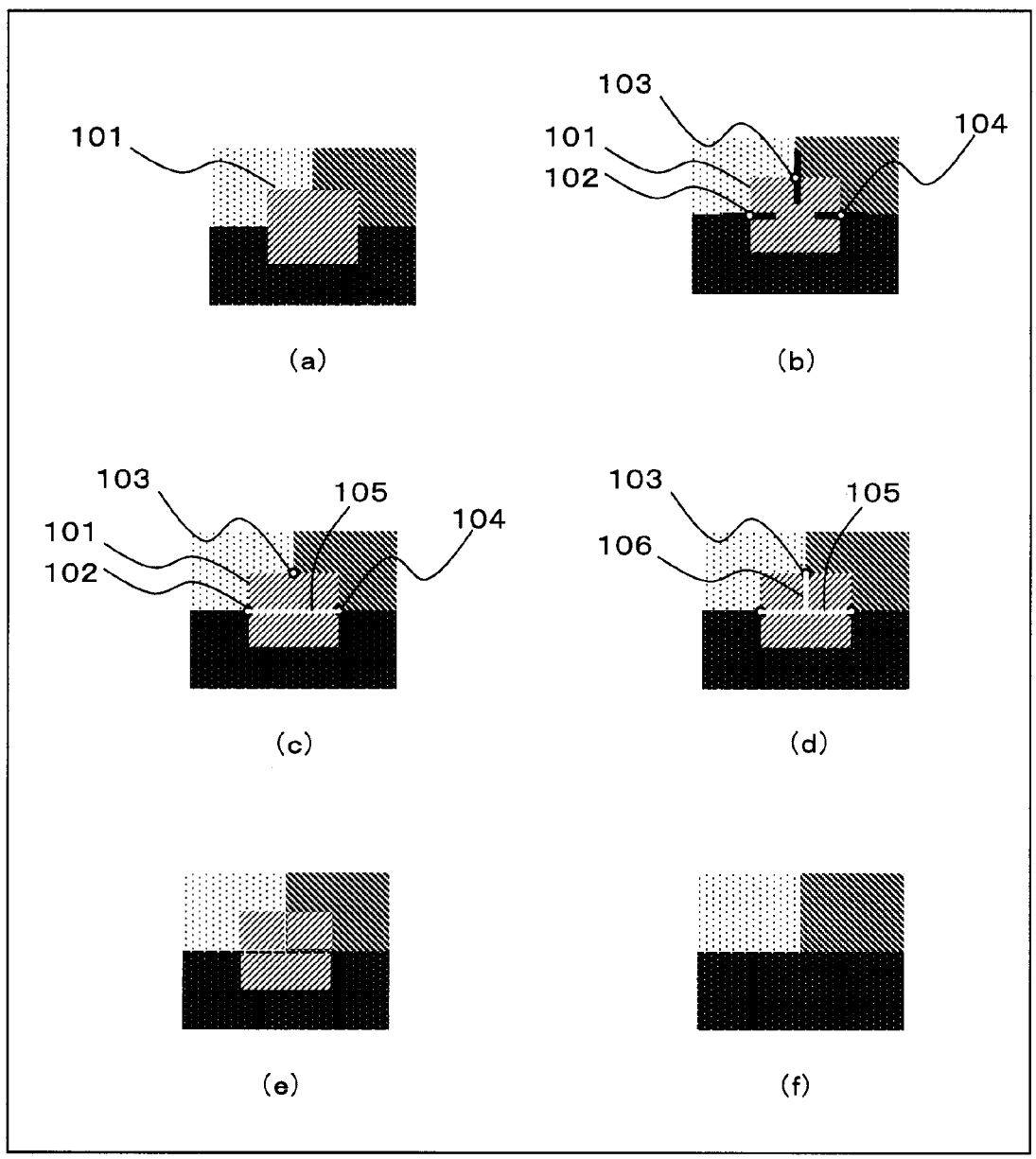
FIG. 15 It depicts an explanatory diagram for explaining exemplary processings of restoring an image.

FIG. 15 is an explanatory diagram for explaining exemplary processings of estimating a pixel value near an edge and restoring an image. An image exemplified in FIG. 15(*a*) is a defect image and a region 101 in the image is a defect region. The defect pixel value estimation means 805 estimates an edge structure in a procedure exemplified below.

At first, the defect pixel value estimation means 805 detects an edge segment based on the image outside the defect region. The defect pixel value estimation means 805 detects an edge segment by using a method such as Canny edge defection as a method for detecting an edge segment. Then, the defect pixel value estimation means 805 detects, among the obtained edge regions (edge segments), edge pixels adjacent to the non-defect region as the ends of the edges present in the defect region. The pixels detected as the ends of the edges are assumed as i in the following.

Figure 21:
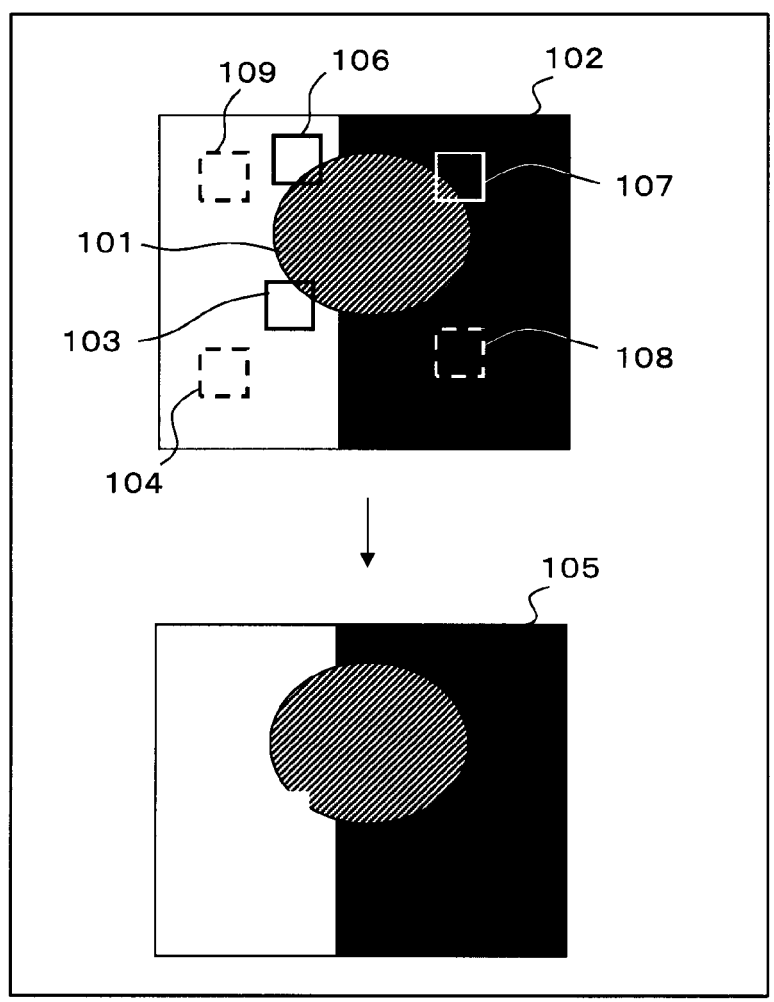
FIG. 21 It depicts an explanatory diagram showing an image before restoration.
Figure 22:
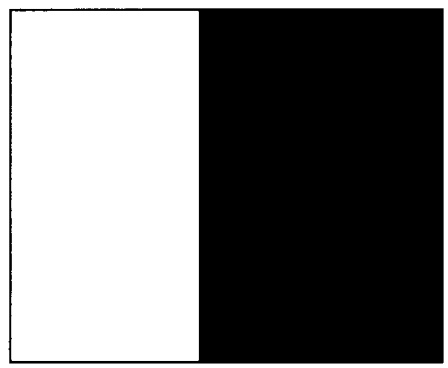
FIG. 22 It depicts an explanatory diagram showing an image after restoration.
Figure 23:
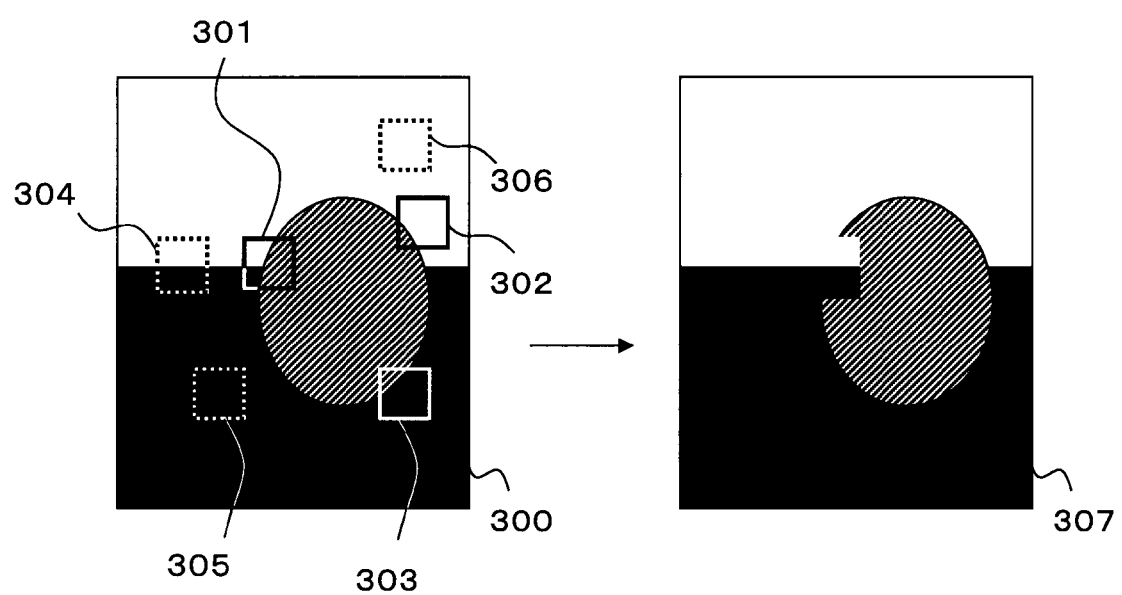
FIG. 23 It depicts an explanatory diagram for explaining a method described in Non-Patent Literature 1.
Figure 24:
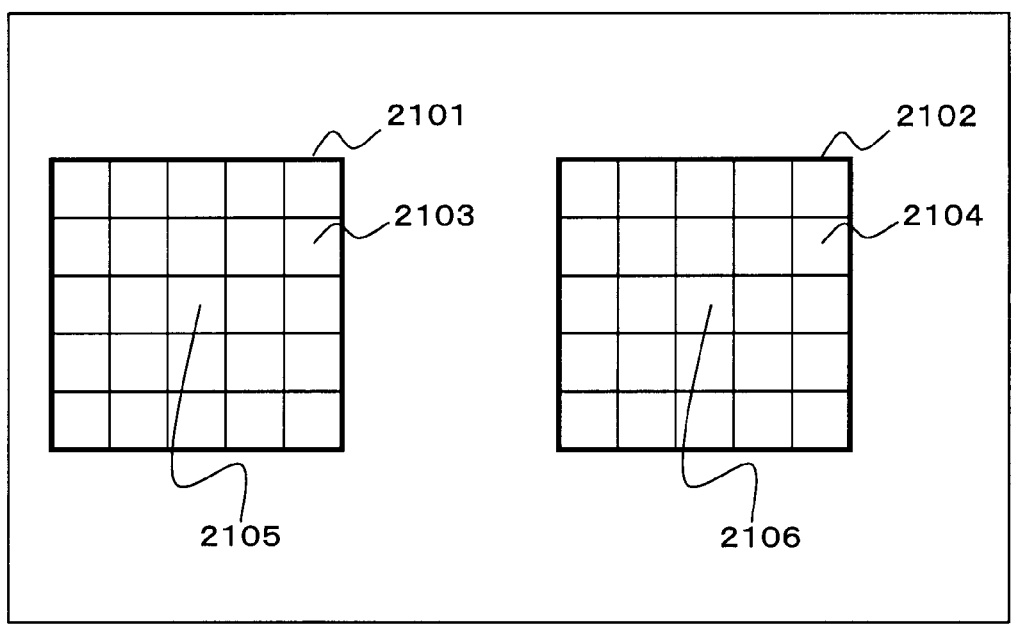
FIG. 24 It depicts an explanatory diagram for explaining pixels in a reference patch corresponding to pixels in a defect patch.
Figure 25:
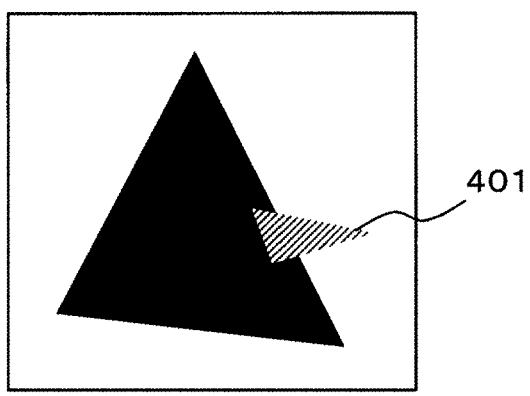
FIG. 25 It depicts an explanatory diagram for explaining a case in which a reference patch which can collapse a restored image is selected.
Figure 26:
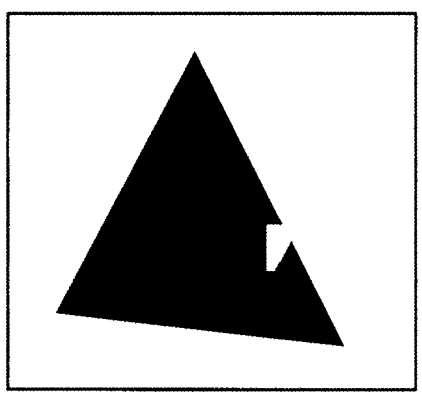
FIG. 26 It depicts an explanatory diagram for explaining a case in which a reference patch which can collapse a restored image is selected.

The defect pixel value estimation means 805 calculates how much the ends of the obtained edges are continuously present in the non-defect region. The defect pixel value estimation means 805 detects an edge which continues for more than the certain number of pixels as a highly-continuous edge. For example, when the number of pixels on the edge to which the pixels belong is 5 or more, the defect pixel value estimation means 805 detects the edge as a highly-continuous edge. In the following, a pixel detected as an end of the highly-continuous edge is denoted as i'. For example, the defect pixel value estimation means 805 detects the pixels 102, 103 and 104 as the pixels i' at the ends of the highly-continuous edges from the image exemplified in FIG. 21(*b*). A set of pixels i' is a subset of pixels i.

The defect pixel value estimation means 805 detects the pixels belonging to the same edge segment among the pixels detected as the ends of the edges. Specifically, the defect pixel value estimation means 805 defines an edge difference d(i, j) defined from the pixels at the ends of the edge as the Formula 17 exemplified below. The defect pixel value estimation means 805 determines that the pixels having d(i, j) equal to or less than a threshold belong to the same edge segment in an order from the pixels at the ends of the edges having a small difference d(i, j). i and j express the pixels at the ends of the edge.

$$d(i,j)=f(i,j)\cdot g(i,j)\cdot c(i,j) \quad \text{(Formula 17)}$$

f(i, j) indicates a difference of a characteristic vector indicating an edge, and is defined as the Formula 18 exemplified below.

$$f(i,j)=|v_i-v_j|^2 \quad \text{(Formula 18)}$$

Herein, $v_i$ indicates a characteristic vector of the pixel i indicating an edge. $v_i$ is defined by a 10-order vector exemplified in the following Formula 19 when the RGB values at the pixel i are assumed as $R_i$, $G_i$, and $B_i$, respectively, and the luminance value is assumed as Ii.

Figure 16:
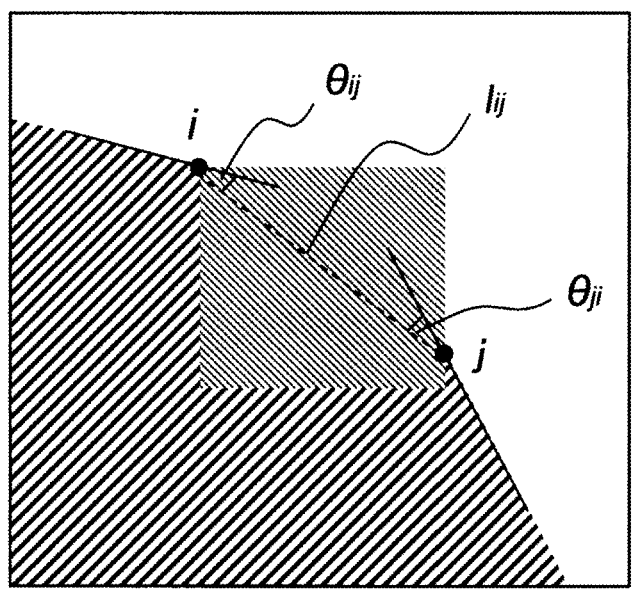
FIG. 16 It depicts an explanatory diagram for explaining a relationship between an angle and a length at end points of an edge.

[Math. 12]

$$v_i = \left( \frac{R_i}{I_i}, \frac{G_i}{I_i}, \frac{B_i}{I_i}, \frac{\nabla_x R_i}{I_i}, \frac{\nabla_x B_i}{I_i}, \frac{\nabla_y R_i}{I_i}, \frac{\nabla_y G_i}{I_i}, \frac{\nabla_y B_i}{I_i}, I_i \right)^T \quad \text{(Formula 19)}$$

g(i, j) is a penalty of a geometric arrangement of the edges. The geometric arrangement will be described below with reference to FIG. 16. FIG. 16 is an explanatory diagram for explaining a relationship between an angle and a length at the end points of an edge. $I_{ij}$ in FIG. 16 indicates a length of the straight line connecting the pixel i and the pixel j. $\theta_{ij}$ indicates an angle [radian] formed between the straight line connecting the pixel j and the pixel i and an edge $e_i$ estimated at the pixel i. $\theta_{ji}$ is also an angle formed between the straight line connecting the pixel i and the pixel j and an edge $e_j$ estimated at the pixel j. When a relationship between the angle and the length at the end points of the edge is as exemplified in FIG. 16, g(i, j) is defined as the Formula 20 exemplified below.

$$g(i,j)=(1+\alpha)\cdot(\theta_{ij}+\theta_{ij})^2)\cdot l_{ij} \quad \text{(Formula 20)}$$

Herein, $\alpha$ is a parameter defined for an angle formed between the straight line connecting the pixel i and the pixel j and an estimated edge, and is previously defined depending on a magnitude of the penalty given to an edge having a different angle.

c(i, j) is an edge reliability and is defined as the Formula 21 exemplified below.

[Math. 13]

$$c(i,j) = \frac{1}{|\nabla I_i|\cdot|\nabla I_j|} \quad \text{(Formula 21)}$$

Herein, $\nabla I_i$ and $\nabla I_j$ indicate the magnitude of the luminance gradient at the pixel i and the pixel j, respectively.

The defect pixel value estimation means 805 estimates an edge segment 105 having the detected pixel 102 and pixel 104 at both ends as an edge segment present in the defect region as exemplified in FIG. 15(*c*). The defect pixel value estimation means 805 calculates the pixels belonging to the edge segment 105 and stores them in the memory (not shown).

Then, the defect pixel value estimation means 805 estimates an edge segment for the pixels detected as the ends of the highly-continuous edge among the pixels at the ends of the non-selected edges. For example, the defect pixel value estimation means 805 estimates an edge 106 linearly extended from the pixel 103 as an edge segment present in the defect image as exemplified in FIG. 15(*d*). Specifically, the defect pixel value estimation means 805 extends the edge along a tilt of the edge outside the defect region to which the pixel 103 belongs until the edge hits against other edge segment 105 from the pixel 103 detected as the end of the highly-continuous edge. The defect pixel value estimation means 805 estimates the edge 106 extended in this way as an edge segment present in the defect image. The defect pixel value estimation means 805 stores the pixels belonging to the edge segment 106 in the memory (not shown).

The defect pixel value estimation means 805 interpolates a pixel value in a defect region in a procedure exemplified below based on the estimated edge structure in the second stage. At first, the defect pixel value estimation means 805 calculates a pixel value of the pixels around the estimated edge based on the pixel value of the pixels at the end points of the edges and their adjacent pixels, and restores only the vicinity of the edges as exemplified in FIG. 15(e).

Figure 17:
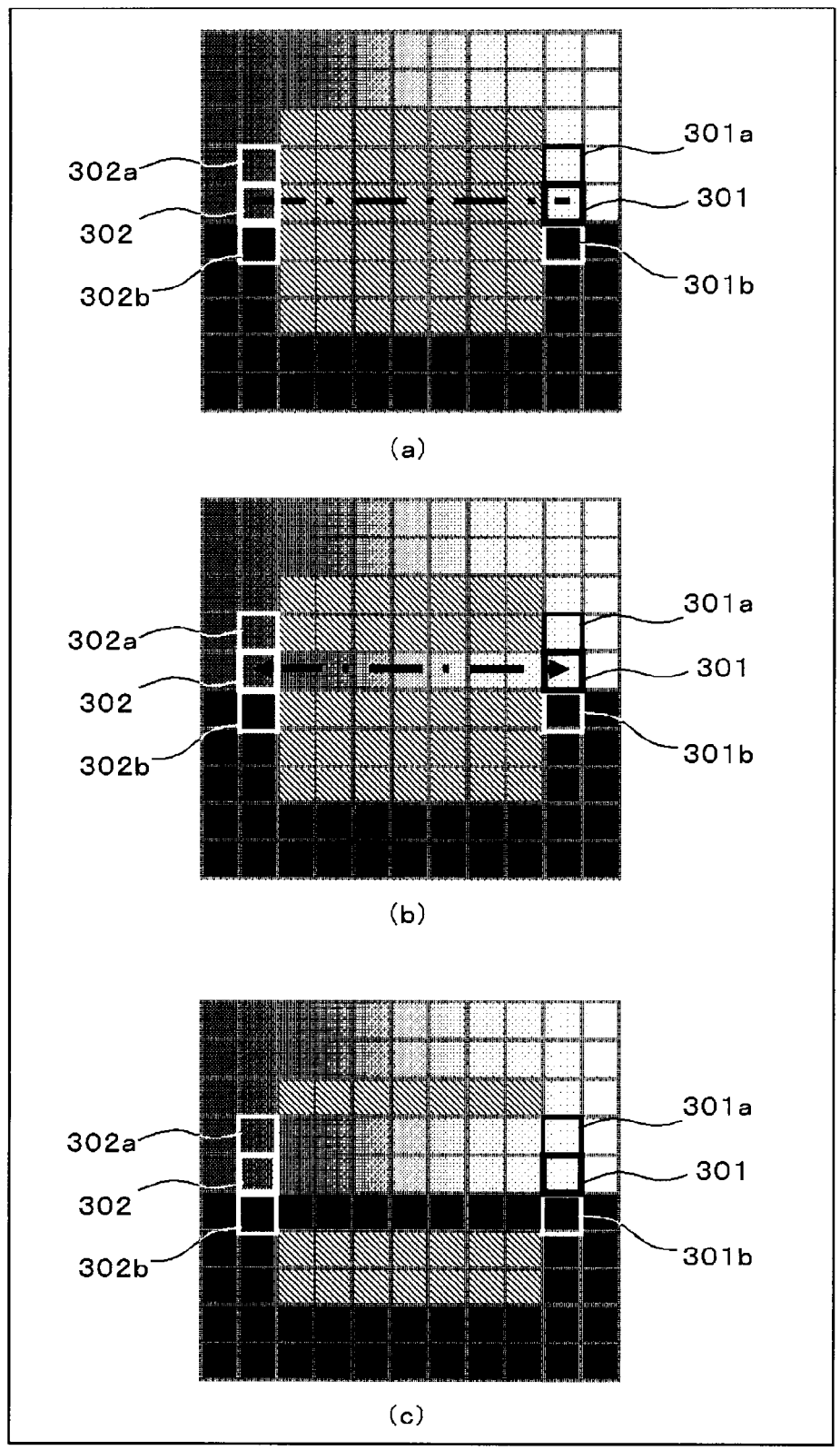
FIG. 17 It depicts an explanatory diagram for explaining exemplary processings of restoring pixel values of pixels around an edge.

The processing of restoring the vicinity of the edges will be described in more detail with reference to FIG. 17. FIG. 17 is an explanatory diagram showing exemplary processings of restoring the pixel values of the pixels around the edges. In the example shown in FIG. 17, each lattice indicates one pixel and a rectangular region 300 at the center is a defect region. It is assumed herein that a pixel 301 and a pixel 302 exemplified in FIG. 17(a) are extracted as edge ends. At this time, the defect pixel value estimation means 805 uses the pixel 301, the pixel 302, and their upper and lower pixels (a pixel 301a, a pixel 301b, a pixel 302a and a pixel 302b) to restore the image. The defect pixel value estimation means 805 determines the pixels 301 and 302 as a pair, and linearly interpolates the pixel values of the pixels connecting the pairs based on a distance from each pair of pixels. FIG. 17(b) shows an exemplary result of the interpolation of the pixels in a defect region by the defect pixel value estimation means 805. The example shown in FIG. 17(b) indicates that the defect pixel value estimation means 805 restores the pixels in a region indicated by an arrow connecting the pixel 301 and the pixel 302.

The defect pixel value estimation means 805 performs a similar processing on the upper and lower pixels of the pixel 301 and the pixel 302 (specifically, a pair of pixel 301a and pixel 302a and a pair of pixel 301b and pixel 302b) thereby to restore the pixel values of the pixels around the edge as in the image exemplified in FIG. 17(c).

Then, the defect pixel value estimation means 805 calculates a pixel value of the remaining pixels in the defect region as a weighted average value of the pixels in the upper, lower, left and right directions of the pixel of interest. The defect pixel value estimation means 805 applies the calculated pixels to the defect image, thereby obtaining the image exemplified in FIG. 15(f).

Figure 18:
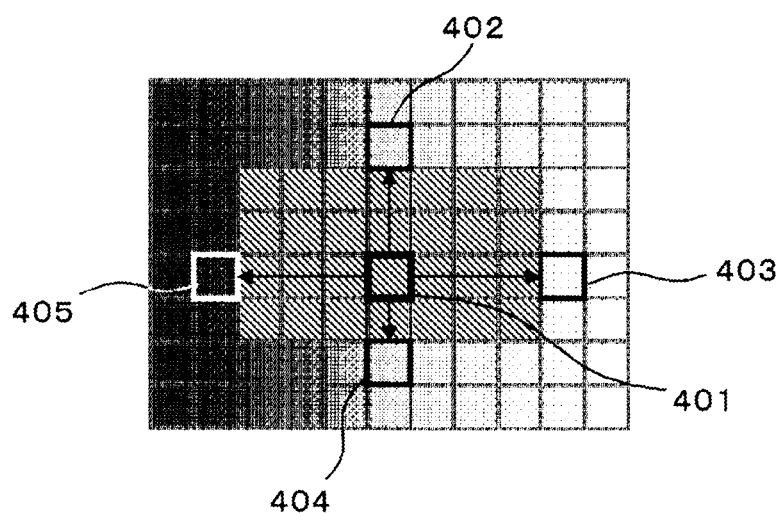
FIG. 18 It depicts an explanatory diagram for explaining exemplary processings of restoring a pixel value of a pixel in a defect region.

The processing of restoring the remaining pixels in the defect region will be described in more detail with reference to FIG. 18. FIG. 18 is an explanatory diagram showing exemplary processings of restoring the pixel value of the pixels in the defect region. In the example shown in FIG. 18, each lattice indicates one pixel and a rectangular region 400 at the center is a defect region. When a pixel to be restored is denoted as 401, the defect pixel value estimation means 805 selects the pixel values of the pixels in the upper, lower, left and right direction of the pixel 401 to be restored, which are in a non-defect region adjacent to the defect region (that is, a pixel 402, a pixel 403, a pixel 404 and a pixel 405). The defect pixel value estimation means 805 weights the pixel values depending on the distances between the pixel to be restored and the pixels, and uses the weights to calculate an average of the pixel values, thereby calculating a pixel value of the pixel 401.

As described above, the edge structure is estimated and the pixel value of the pixels in the defect region is interpolated based on the estimated edge, thereby estimating a pixel value in the defect region.

There has been described above that when a pixel value of a pixel in a defect region is restored, the edge structure is first estimated, the pixel values of the pixels near the estimated edge are then estimated, and an average of the pixel values of the pixels in the upper, lower, left and right non-defect regions adjacent to the defect region is further calculated, thereby estimating the pixel values of the pixels other than the pixels near the edge in the defect region. Instead of the method, based on the estimated edge structure, a pixel value in the defect region may be estimated by the following method. It is assumed that when a pixel is present near the estimated edge structure for the pixel values of the pixels in the defect region, a pixel value of the adjacent pixels across the edge structure easily changes, and when a pixel is not present near the estimated edge structure, a pixel value of the adjacent pixels does not easily change. Thus, a function using a pixel value of each pixel as a variable (which will be denoted as optimization function below) is defined, in which a value of the function is larger when a pixel value against the above property is present, and the defect pixel value estimation means 805 may assume a pixel value having the minimum value of the function as an estimated pixel value. For example, when the optimization function is assumed as E, the defect pixel value estimation means 805 may assume a pixel value having the minimum optimization function E as an estimated pixel value based on the Formula 22 exemplified below.

[Math. 14]

$$E(x_1, \ldots, x_i, \ldots, x_n) = \sum_i g_i(x_i) + \sum_{i,j} h_{ij}(x_i, x_j) \quad \text{(Formula 22)}$$

Herein, the subscripts i and j denote the pixels in the defect image, respectively. The optimization function E is defined by a sum of a function $g_i$ (first term) per pixel defined by a pixel value and a function $h_{ij}$ (second term) defined based on a relationship between the pixel values of the adjacent pixels. The function $g_i$ is a term for restricting a pixel value of the pixels in a non-defect region from having the same value as a defect image. The function $h_{ij}$ is a term for restricting the fact that for a pixel value of the pixels in a defect region when a pixel is present near an estimated edge structure, a pixel value of the adjacent pixels across the edge structure easily changes, and when a pixel is not present near the estimated edge structure, a pixel value of the adjacent pixels does not easily change. The pixel i and the pixel j are adjacent to each other. Herein, the methods for finding a pixel value indicating a global minimum value of the optimization function E employ a method using discrete value optimization with a pixel value as a discrete value, and a method using continuous value optimization with a pixel value as a continuous value. The discrete value optimization method may employ Graph Cuts, Belief Propagation, Three-Reweighted Message Passing, Iterated Conditional Modes or Simulated Annealing, for example. The continuous value optimization method may employ a gradient method, a conjugate gradient method, a Gauss-Newton method or a Levenberg-Marquardt method, for example. Alternatively, an approximate minimum value (local minimum value) of the optimization function E may be found not by finding a global minimum value by the above methods but by sequentially determining the pixel values in a defect region.

Figure 19:
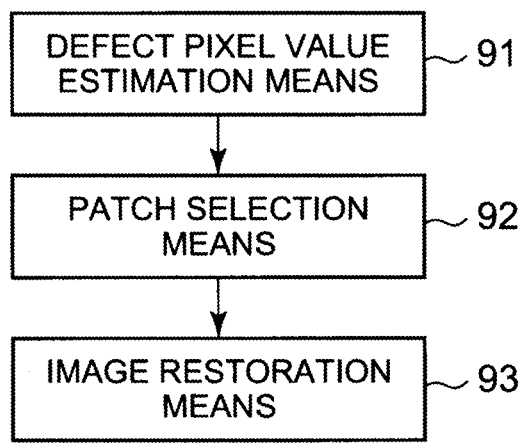
FIG. 19 It depicts a block diagram showing an exemplary minimum structure of the image restoration system according to the present invention.
Figure 20:
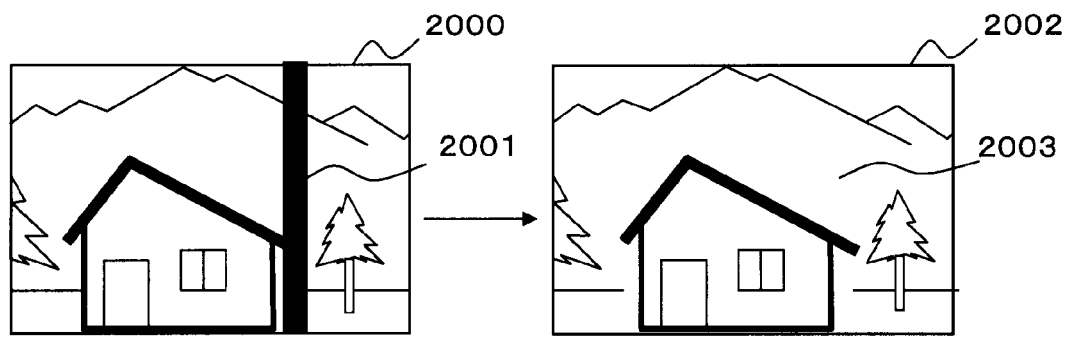
FIG. 20 It depicts an explanatory diagram showing a method for restoring a region against a user's intention.

An exemplary minimum structure of the image restoration system according to the present invention will be described. FIG. 19 is a block diagram showing an exemplary minimum structure of the image restoration system according to the present invention. The image restoration system according to the present invention includes a defect pixel value estimation means 91 (such as the defect pixel value estimation means 805) for estimating a pixel value which each pixel in a defect region as a region to be restored in an image (such as defect image) may take, based on a pixel value of the pixels in a non-defect region as a region in the image not including the defect region (for example, for configuring a probability distribution (xi|{xk}) and estimating a pixel), a patch selection means 92 (such as the patch selection means 806) for selecting a pair of patches in which a defect patch and a reference patch are most similar to each other from among the pairs of patches including the defect patch as an image of a region including a defect region and the reference patch as an image of a region not including a defect region, and an image restoration means 93 (such as the image restoration means 807) for restoring a defect patch based on a reference patch in the selected pair of patches (for example, for restoring by α blending).

The patch selection means 92 selects a pair of patches (such as (ψp0, ψq0)) in which the image of the defect patch and the image of the reference patch are most similar to each other (for example, a value of the patch selection function E(ψp, ψq) is the smallest) based on a relationship (such as the patch selection function E(ψp, ψq)) between an estimated pixel value of a defect region in the defect patch and a pixel value of the corresponding reference patch.

With the structure, an image in which a region against a user's intention is present can be restored without being collapsed.

At least the image restoration systems described below are disclosed in any of the above exemplary embodiments.

(1) An image restoration system including a defect pixel value estimation means (such as the defect pixel value estimation means 805) that estimates a pixel value which each pixel in a defect region as a region to be restored in an image (defect image) may take, based on a pixel value of pixels in a non-defect region as a region in the image not including the defect region (for example, that configures a probability distribution p(xi|{xk}) and estimates a pixel), a patch selection means (such as the patch selection means 806) that selects a pair of patches in which a defect patch and a reference patch are most similar to each other from among the pairs of patches including the defect patch as an image of a region including the defect region and the reference patch as an image of a region not including the defect region, and an image restoration means (such as the image restoration means 807) that restores the defect patch based on the reference patch in the selected pair of patches (for example, that restores by α blending), wherein the patch selection means selects a pair of patches (such as (ψp, ψq)) in which an image of a defect patch and an image of a reference patch are most similar to each other (for example, a value of the patch selection function E(ψp, ψq) is the smallest), based on a relationship (for example, the patch selection function E(ψp, ψq)) between an estimated pixel value of a defect region in the defect patch and a pixel value of the corresponding reference patch.

(2) The image restoration system wherein the patch selection means (such as the patch selection means 806a) selects a pair of patches based on a degree of similarity (for example, a value of the function B(ψp, ψq)) between an image of a defect patch and an image of a reference patch and a likelihood (such as the likelihood Lp and the likelihood Lq) indicating the amount of likelihood of a pixel value set in each pixel in the defect patch and the reference patch (for example, based on (Formula 9)) from among the pairs of patches including the defect patch and the reference patch.

(3) The image restoration system including a likelihood update means (such as the likelihood update means 1103) that calculates a likelihood by a method in which a likelihood is calculated to be higher as the images selected as a pair of defect patch and reference patch are more similar to each other, and uses the calculated likelihood to update a preset likelihood (for example, stored in the likelihood storage means 1102 by the likelihood initial value setting means 1101) of each pixel in an image depending on a defect region in the input image, wherein the patch selection means selects a pair of patches based on a degree of similarity between an image of a defect patch and an image of a reference patch, and an updated likelihood of each pixel in the defect patch and the reference patch.

(4) The image restoration system wherein the patch selection means includes a defect patch selection means (such as the defect patch selection means 1301) that selects a defect patch based on structure information of defect patch candidates, and a reference patch selection means (such as the reference patch selection means 1302) that selects a reference patch which is most similar to the defect patch from among reference patches, based on a relationship between an estimated pixel value of a defect region in the selected defect patch and a pixel value of the corresponding reference patch.

(5) The image restoration system including a patch classification means (such as the patch classification means 1501) that classifies (for example, clusters) patch candidates classified as a defect patch and a reference patch into groups within the respective candidates of the defect patch and the reference patch based on a common property (such as region on a border, region on a background color or region of object), wherein the patch selection means (such as the patch selection means 806c) selects a defect patch and a reference patch classified in the same group as a pair of patches.

(6) The image restoration system including a patch storage means (such as the patch storage means 1702) that stores patch candidates as reference patch candidates, wherein the patch selection means (such as the patch selection means 806d) selects a pair of patches in which a reference patch or patch candidate and a defect patch are most similar to each other from the pairs of patches including the reference patch or the patch candidate stored in the patch storage means, and the defect patch.

(7) The image restoration system including a patch input means (such as the patch input means 1701) that is input with patch candidates and stores the input patch candidates in a patch storage means, wherein the patch selection means selects a pair of patches in which a reference patch or patch candidate and a defect patch are most similar to each other from among the pairs of patches including the reference patch or the patch candidate input by the patch input means and the defect patch.

(8) The image restoration system including a defect region extraction means (such as the defect region extraction means 803) that extracts a defect region from a defect image as an image including the defect region, wherein the patch selection means selects a pair of patches in which a defect patch and a reference patch are most similar to each other from the pairs of patches including the defect patch as an image of a region including the extracted defect region and the reference patch.

The present invention has been described above with reference to the embodiments and examples, but the present invention is not limited to the embodiments and the examples. The structure and details of the present invention may be variously changed within the scope of the present invention understood by those skilled in the art.

The present application claims the priority based on Japanese Patent Application No. 2009-265038 filed on Nov. 20, 2009, the entire disclosure of which is incorporated herein.

INDUSTRIAL APPLICABILITY

The present invention is suitably applied to an image restoration system for restoring a region against a user's intention in an image. Further, the present invention is applicable to privacy protection for a person captured in an image disclosed on a Web without his/her permission, by restoring a region of the person as a defect region. Further, the present invention is applicable to a case in which when an analog photograph with physical damages (such as scratches or contaminations) is captured by a scanner to be a digital image, the physical damages are restored as a defect region, thereby enhancing the value of the image. Furthermore, the present invention is applicable to a case in which when a previously-broadcasted image is reused, telop in the image is restored as a defect region, thereby enhancing the value of the image. The present invention is applicable to a case in which a part with noise or blur in an image is restored as a defect region, thereby obtaining an image with a higher quality.

REFERENCE SIGNS LIST

800 Computer
801 Image input means
802 Restored image output means
803 Defect region extraction means
804 Frame memory
805 Defect pixel value estimation means
806 Patch selection means
807 Image restoration means
1301 Defect patch selection means
1302 Reference patch selection means

The invention claimed is:

1. An image restoration system comprising:
hardware including a processor;
a defect pixel value estimation unit implemented at least by the hardware and that estimates a pixel value which each pixel in a defect region as a region to be restored in an image may take, based on a pixel value of pixels in a non-defect region as a region in the image not including the defect region;
a patch selection unit implemented at least by the hardware and that selects a pair of patches in which a defect patch and a reference patch are most similar to each other from among the pairs of patches including the defect patch as an image of a region including the defect region and the reference patch as an image of a region not including the defect region; and
an image restoration unit implemented at least by the hardware and that restores the defect patch based on the reference patch in the selected pair of patches,
wherein a patch selection function is expressed as a product or sum of at least two types of functions, one type of function is a function which takes a smaller value as a luminance gradient of the defect patch candidate is larger, and another type of function is a function which takes a smaller value as the image of the defect patch candidate and the image of the reference patch candidate are more similar to each other, and
the patch selection unit selects a pair of patches having smaller value of the patch selection function as a pair of patches to be restored based on a relationship between an estimated pixel value of a defect region in the defect patch and a pixel value of the corresponding reference patch.

2. The image restoration system according to claim 1, wherein the patch selection unit selects a pair of patches based on a degree of similarity between an image of a defect patch and an image of a reference patch and a likelihood indicating the amount of likelihood of a pixel value set in each pixel in the defect patch and the reference patch from among the pairs of patches including the defect patch and the reference patch.

3. The image restoration system according to claim 2, comprising:
a likelihood update unit implemented at least by the hardware and that calculates a likelihood by a method in which a likelihood is calculated to be higher as the images selected as a pair of defect patch and reference patch are more similar to each other, and uses the calculated likelihood to update a preset likelihood of each pixel in an image depending on a defect region in the input image,
wherein the patch selection unit selects a pair of patches based on a degree of similarity between an image of a defect patch and an image of a reference patch, and an updated likelihood of each pixel in the defect patch and the reference patch.

4. The image restoration system according to claim 1, wherein the patch selection unit includes:
a defect patch selection unit implemented at least by the hardware and that selects a defect patch based on structure information of defect patch candidates; and
a reference patch selection unit implemented at least by the hardware and that selects a reference patch which is most similar to the defect patch from among reference patches, based on a relationship between an estimated pixel value of a defect region in the selected defect patch and a pixel value of the corresponding reference patch.

5. The image restoration system according to claim 1, comprising:
a patch classification unit implemented at least by the hardware and that classifies patch candidates classified as a defect patch and a reference patch into groups within the respective candidates of the defect patch and the reference patch based on a common property,
wherein the patch selection unit selects a defect patch and a reference patch classified in the same group as a pair of patches.

6. The image restoration system according to claim 1, comprising:
a patch storage unit implemented at least by the hardware and that stores patch candidates as reference patch candidates,
wherein the patch selection unit selects a pair of patches in which a reference patch or patch candidate and a defect patch are most similar to each other from the pairs of patches including the reference patch or the patch candidate stored in the patch storage unit, and the defect patch.

7. The image restoration system according to claim 6, comprising:
a patch input unit implemented at least by the hardware and that is input with patch candidates and stores the input patch candidates in a patch storage unit,
wherein the patch selection unit selects a pair of patches in which a reference patch or patch candidate and a defect patch are most similar to each other from among the pairs of patches including the reference patch or the patch candidate input by the patch input unit and the defect patch.

8. The image restoration system according to claim 1, comprising:
a defect region extraction unit implemented at least by the hardware and that extracts a defect region from a defect image as an image including the defect region,
wherein the patch selection unit selects a pair of patches in which a defect patch and a reference patch are most similar to each other from the pairs of patches including the defect patch as an image of a region including the extracted defect region and the reference patch.

9. An image restoration method comprising:

estimating a pixel value which each pixel in a defect region as a region to be restored in an image may take, based on a pixel value of pixels in a non-defect region as a region in the image not including the defect region;

selecting a pair of patches in which a defect patch and a reference patch are most similar to each other from among the pairs of patches including the defect patch as an image of a region including the defect region and the reference patch as an image of a region not including the defect region;

wherein a patch selection function is expressed as a product or sum of at least two types of functions, one type of function is a function which takes a smaller value as a luminance gradient of the defect patch candidate is larger, and another type of function is a function which takes a smaller value as the image of the defect patch candidate and the image of the reference patch candidate are more similar to each other, and when selecting the pair of patches, selecting a pair of patches having smaller value of the patch selection function as a pair of patches to be restored, based on a relationship between an estimated pixel value of a defect region in the defect patch and a pixel value of the corresponding reference patch; and restoring the defect patch based on the reference patch in the selected pair of patches.

10. The image restoration method according to claim 9, comprising:

when selecting a pair of patches, selecting a pair of patches based on a degree of similarity between an image of a defect patch and an image of a reference patch and a likelihood indicating the amount of likelihood of a pixel value set in each pixel in the defect patch and the reference patch, from among the pairs of patches including the defect patch and the reference patch.

11. The image restoration method according to claim 10, comprising:

calculating a likelihood by a method in which a likelihood is calculated to be higher as the images selected as a pair of defect patch and reference patch are more similar to each other;

updating a preset likelihood of each pixel in an image depending on a defect region in the input image by use of the calculated likelihood; and when selecting a pair of patches, selecting a pair of patches based on a degree of similarity between an image of a defect patch and an image of a reference patch and an updated likelihood of each pixel in the defect patch and the reference patch.

12. The image restoration method according claim 9, comprising:

when selecting a pair of patches, selecting a defect patch based on structure information of defect patch candidates, and selecting a reference patch which is most similar to the defect patch from among reference patches based on a relationship between an estimated pixel value of a defect region in the selected defect patch and a pixel value of the corresponding reference patch.

13. The image restoration method according to claim 9, comprising:

classifying patch candidates classified as a defect patch and a reference patch into groups within the respective candidates of the defect patch and the reference patch based on a common property; and when selecting a pair of patches, selecting a defect patch and a reference patch classified into the same group as a pair of patches.

14. The image restoration method according to claim 9, comprising:

when selecting a pair of patches, selecting a pair of patches in which a reference patch or patch candidate and a defect patch are most similar to each other from the pairs of patches including the reference patch or the patch candidate stored in a patch storage unit that stores the patch candidates as reference patch candidates, and the defect patch.

15. The image restoration method according to claim 14, comprising:

storing input patch candidates in the patch storage unit; and when selecting a pair of patches, selecting a pair of patches in which a reference patch or patch candidate and a defect patch are most similar to each other from among the pairs of patches including the reference patch or the patch candidate input by the patch input unit, and the defect patch.

16. The image restoration method according to claim 9, comprising:

extracting a defect region from a defect image as an image including the defect region; and when selecting a pair of patches, selecting a pair of patches in which a defect patch and a reference patch are most similar to each other from among the pairs of patches including the defect patch as an image of a region including the extracted defect region and the reference patch.

17. A non-transitory computer readable information recording medium storing an image restoration program, when executed by a processor, performs a method for:

estimating a pixel value which each pixel in a defect region as a region to be restored in an image may take, based on a pixel value of pixels in a non-defect region as a region in the image not including the defect region;

selecting a pair of patches in which a defect patch and a reference patch are most similar to each other from among the pairs of patches including the defect patch as an image of a region including the defect region and the reference patch as an image of a region not including the defect region;

wherein a patch selection function is expressed as a product or sum of at least two types of functions, one type of function is a function which takes a smaller value as a luminance gradient of the defect patch candidate is larger, and another type of function is a function which takes a smaller value as the image of the defect patch candidate and the image of the reference patch candidate are more similar to each other, and when selecting the pair of patches, selecting a pair of patches having smaller value of the patch selection function as a pair of patches to be restored, based on a relationship between an estimated pixel value of a defect region in the defect patch and a pixel value of the corresponding reference patch; and restoring the defect patch based on the reference patch in the selected pair of patches.

18. The computer readable information recording medium according to claim 17, comprising:

when selecting a pair of patches, selecting a pair of patches based on a degree of similarity between an image of a defect patch and an image of a reference patch and a likelihood indicating the amount of likelihood of a pixel value set in each pixel in the defect patch and the reference patch from among the pairs of patches including the defect patch and the reference patch.

19. The computer readable information recording medium according to claim 18, further comprising:

calculating a likelihood by a method in which a likelihood is calculated to be higher as the images selected as a pair of defect patch and reference patch are more similar to each other;

updating a preset likelihood of each pixel in an image depending on a defect region in the input image by use of the calculated likelihood; and when selecting a pair of patches, selecting a pair of patches based on a degree of similarity between an image of a defect patch and an image of a reference patch and an updated likelihood of each pixel in the defect patch and the reference patch.

20. The computer readable information recording medium according to claim 17, comprising:

when selecting a pair of patches, selecting a defect patch based on structure information of defect patch candidates, and selecting a reference patch which is most similar to the defect patch from among reference patches, based on a relationship between an estimated pixel value of a defect region in the selected defect patch and a pixel value of the corresponding reference patch.

21. The computer readable information recording medium according to claim 17, further comprising:

classifying patch candidates classified as a defect patch and a reference patch into groups within the respective candidates of the defect patch and the reference patch based on a common property; and when selecting a pair of patches, selecting a defect patch and a reference patch classified in the same group as a pair of patches.

22. The computer readable information recording medium according to claim 17, comprising:

when selecting a pair of patches, selecting a pair of patches in which a reference patch or patch candidate and a defect patch are most similar to each other from the pairs of patches including the reference patch or the patch candidate stored in the patch storage unit that stores patch candidates as reference patch candidates, and the defect patch.

23. The computer readable information recording medium according to claim 22, further comprising:

storing input patch candidates in the patch storage unit; and when selecting a pair of patches, selecting a pair of patches in which a reference patch or patch candidate and a defect patch are most similar to each other from among the pairs of patches including the reference patch or the patch candidate input by the patch input unit and the defect patch.

24. The computer readable information recording medium according to claim 17, further comprising:

extracting a defect region from a defect image as an image including the defect region, and when selecting a pair of patches, selecting a pair of patches in which a defect patch and a reference patch are most similar to each other from among the pairs of patches including the defect patch as an image of a region including the extracted defect region and the reference patch.

* * * * *

UNITED STATES PATENT AND TRADEMARK OFFICE
CERTIFICATE OF CORRECTION

PATENT NO. : 8,798,373 B2  
APPLICATION NO. : 13/510887  
DATED : August 5, 2014  
INVENTOR(S) : Shibata Page 1 of 1

It is certified that error appears in the above-identified patent and that said Letters Patent is hereby corrected as shown below:

In the Specification

Column 10, Line 66: Delete "$\omega$" and insert -- $\Psi$ --

Column 11, Line 2: Delete "$\omega$p" and insert -- $\Psi$p --

Column 11, Line 5: Delete "($\omega$p, $\omega$q)" and insert -- ($\Psi$p, $\Psi$q) --

Column 11, Line 35: Delete "$\omega$p" and insert -- $\Psi$p --

Column 12, Line 2: Delete "$\omega$p" and insert -- $\Psi$p --

Column 16, Line 33: Delete "$\omega$p" and insert -- $\Psi$p --

Column 16, Line 56: Delete "$\omega$p" and insert -- $\Psi$p --

Column 17, Line 11: Delete "$\omega$p" and insert -- $\Psi$p --

Column 28, Line 40: Delete "$\omega$p" and insert -- $\Psi$p --

Signed and Sealed this  
Third Day of February, 2015

Michelle K. Lee  
*Deputy Director of the United States Patent and Trademark Office*